(12) United States Patent
Murata et al.

(10) Patent No.: US 6,272,981 B1
(45) Date of Patent: Aug. 14, 2001

(54) CHIP COMPRESSING APPARATUS

(75) Inventors: Shintaro Murata, Nagoya; Katsuji Yonekawa, Chiryu, both of (JP)

(73) Assignee: Fuji Machine Mfg. Co., Ltd., Aichi-ken (JP)

( * ) Notice: Subject to any disclaimer, the term of this patent is extended or adjusted under 35 U.S.C. 154(b) by 0 days.

(21) Appl. No.: 09/315,135

(22) Filed: May 20, 1999

(30) Foreign Application Priority Data

Jun. 5, 1998 (JP) .................................................. 10-158139

(51) Int. Cl.$^7$ ............................ B30B 11/04; B30B 15/04; B30B 15/18; B30B 9/32
(52) U.S. Cl. ............................ 100/50; 100/218; 100/249; 100/256
(58) Field of Search .................................. 100/48, 50, 52, 100/217, 229 R, 249, 256, 218

(56) References Cited

U.S. PATENT DOCUMENTS

| | | |
|---|---|---|
| 1,460,026 | 6/1923 | Madden . |
| 2,536,387 | 1/1951 | Mulvany . |
| 3,145,647 * | 8/1964 | Dinkov et al. ............... 100/229 R X |
| 3,168,033 * | 2/1965 | Hansen ............................ 100/249 X |
| 4,377,376 | 3/1983 | De Santis . |
| 4,557,190 * | 12/1985 | Vezzani ............................ 100/249 X |
| 5,326,511 | 7/1994 | Cooper et al. . |
| 5,391,069 | 2/1995 | Bendzick . |
| 5,558,013 | 9/1996 | Blackstone, Jr. . |
| 5,664,492 * | 9/1997 | Bendzick ......................... 100/249 X |
| 5,873,304 * | 2/1999 | Ruf ................................... 100/249 X |

FOREIGN PATENT DOCUMENTS

| | | |
|---|---|---|
| 331997 | 1/1921 | (DE) . |
| 0 130 277 A1 | 1/1985 | (EP) . |
| 0 367 859 A1 | 5/1990 | (EP) . |
| 0 490 148 A2 | 6/1992 | (EP) . |
| 2 726 219 | 5/1996 | (FR) . |
| 1201391 * | 8/1970 | (GB) ................................. 100/249 |

* cited by examiner

Primary Examiner—Stephen F. Gerrity
(74) Attorney, Agent, or Firm—Oliff & Berridge, PLC

(57) ABSTRACT

A chip compressing apparatus, including a housing which has an inner space having opposite open ends, a movable member which is movable, along one of the opposite open ends of the housing, to a closing position where the movable member closes the one open end of the housing and to an opening position where the movable member opens the one open end, a movable-member moving device which moves the movable member to the closing position and to the opening position, a compressing ram which is inserted in the inner space of the housing through the other open end thereof, such that the compressing ram is movable in an axial direction of the housing, a ram moving device which moves the compressing ram in the axial direction so that the ram cooperates with the housing and the movable member being positioned at the closing position to compress metallic chip which is stored in the inner space of the housing, and a supporting device which supports the housing and the movable member such that at least when the compressing ram compresses the metallic chip, the housing and the movable member are not separated from each other, and at least when the movable member is moved from the closing position thereof to the opening position thereof, the housing and the movable member are separable from each other.

20 Claims, 14 Drawing Sheets

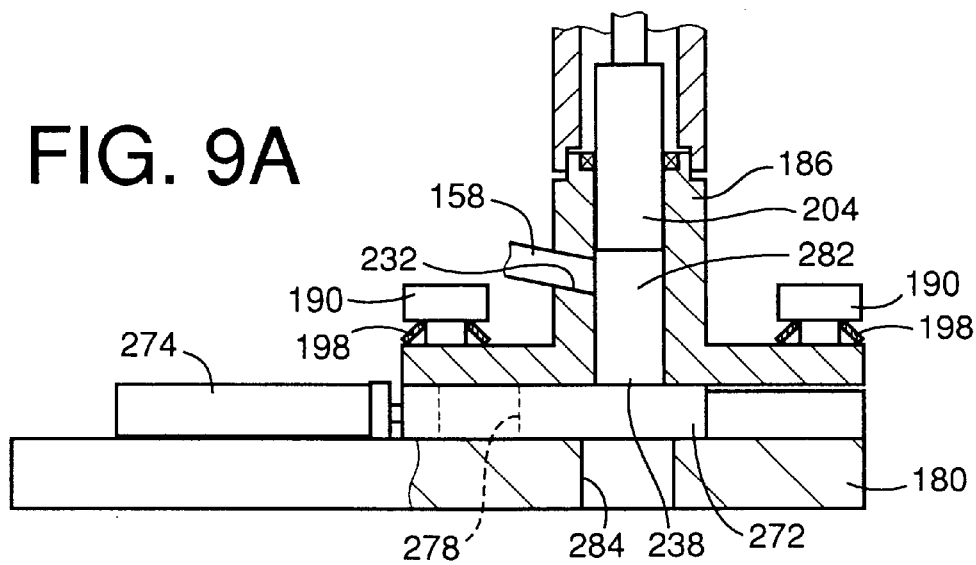
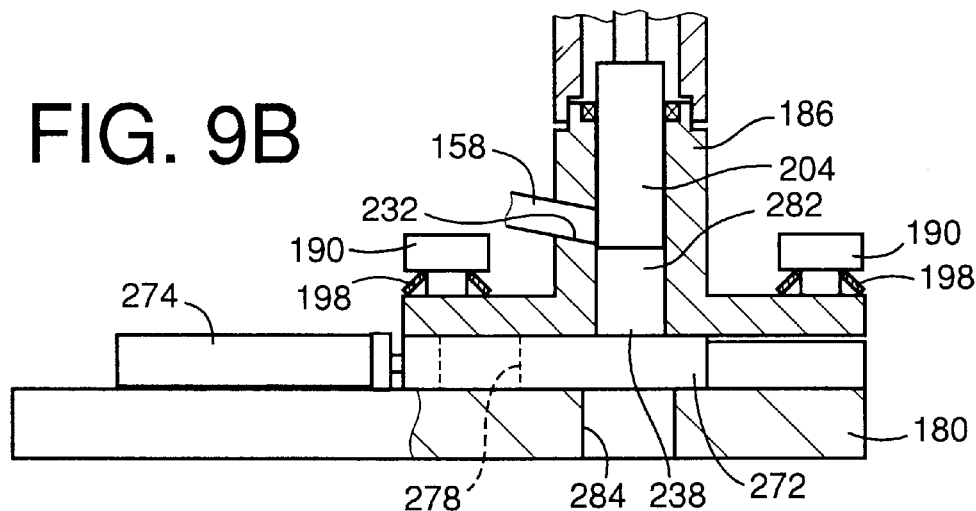
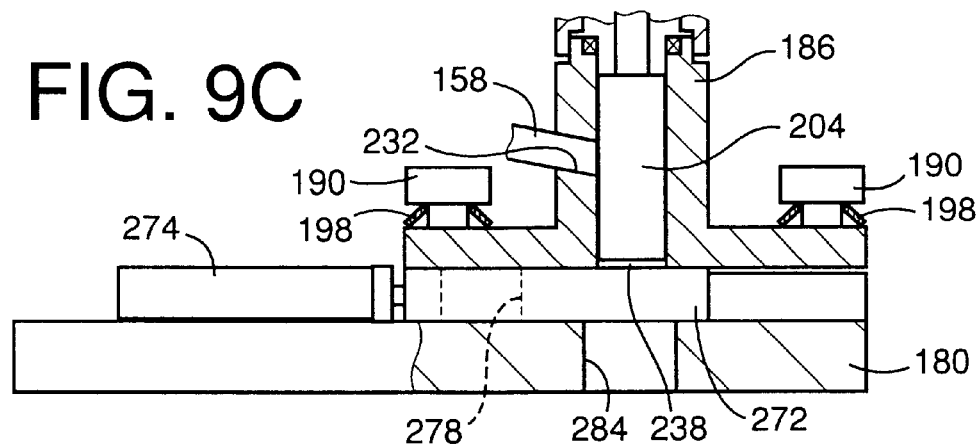

CHIP COMPRESSING APPARATUS

BACKGROUND OF THE INVENTION

1. Field of the Invention

The present invention relates to an apparatus for compressing metallic chip produced from the cutting of metallic workpieces (hereinafter, referred to as the "chip"), and particularly to the art of downsizing the apparatus and improving the life expectancy of the same.

2. Related Art Statement

There is known a chip compressing device which includes a housing having two holes extending perpendicularly to each other, a chip compressing ram fitted in one of the two holes (hereinafter, referred to as the ram-receive hole) such that the ram is movable in an axial direction of the one hole, a movable member fitted in the other hole (hereinafter, referred to as the movable-member-receive hole) such that the movable member is movable in an axial direction of the other hole, and a movable-member moving device which moves the movable member to an operative position where the movable member closes one of opposite open ends of the ram-receiver hole that is nearer to the movable-member-receive hole, and cooperates with the ram-receive hole to define a chip storing space having a bottom wall, and to a retracted position away from the operative position. In the state in which the chip is stored in the chip storing space, the compressing ram is moved downward and cooperates with the housing and the movable member to compress the metallic chip. After the compressing, the movable member is moved or retracted to the retracted position, to open the bottom of the chip storing space, and the ram is further moved downward to push the compressed chip out of the ram-receive hole into the movable-member-receive hole. Then, the movable member is moved to the operative position, to push the compressed chip out of the movable-member-receive hole.

However, the prior chip compressing device has various problems. One of them is that the movable-member moving device that moves the movable member to the operative and retracted positions must produce a great operation force, which leads to increasing the size, and the production cost, of the chip compressing device. When the chip is compressed, the movable member is pressed by the chip compressing ram via the chip. Even after the ram is moved away from the compressed chip following the compressing, the movable member remains pressed by the compressed chip. A frictional force is produced between the chip and the housing. When the chip is compressed, the frictional force acts in a direction opposite to the direction in which the chip is compressed by the ram, so that the frictional force decreases the force of the ram to press the movable member via the chip. After the compressing, the frictional force acts in the direction in which to press the movable member, so that the chip presses the movable member with a force equal to the frictional force.

This pressing force is produced because the housing supports the chip with the frictional force, and is great. Once the chip compressing ram is moved away from the compressed chip, the compressed chip expands, i.e., produces a spring back. Since, however, the open end of the ram-receive hole is closed by the movable member and accordingly the compressed chip cannot expand into the movable-member-receive hole, it expands in a direction opposite to a direction toward the movable member. Thus, there occurs a frictional force, between the chip and the housing, in the direction toward the movable member to resist the spring back of the chip. The spring back of the compressed chip stops at a position where the force to produce the spring back is counterbalanced by the frictional force and at that timing the frictional force becomes maximum. Thus, the movable member is pressed by the compressed chip with a force equal to the maximum frictional force. Therefore, the movement of the movable member to the retracted position needs a force greater than the sum of (a) the product of the force equal to the maximum frictional force and a friction coefficient between the chip and the movable member and (2) the product of the force equal to the maximum frictional force and a friction coefficient between the housing and the movable member. Assuming that the chip compressing force of the ram is not changed, the maximum frictional force increases as the amount of chip compressed increases. Thus, the movable-member moving device must produce a great operation force to move the movable member, which leads to increasing the size, and the production cost, of the chip compressing device.

Another problem with the prior chip compressing device is that in some cases the chip compressing ram is moved downward in the state in which no or little chip is stored in the chip storing space, so that the ram and the movable member are damaged. If the ram is moved downward in the state in which the chip storing space is substantially empty and only a little amount of chip, a shot ball which had been adhered to a workpiece, and/or a broken piece of a tip of a cutting tool remain on the movable member, the ram presses those remains against the movable member and accordingly local stresses are produced in the ram and the movable member. Thus, the ram and the movable member are scarred. In the case where the remains such as the chip are softer than the ram and the movable member, it does not seem that the ram or the movable member is damaged but, in fact, they are damaged.

If the ram or the movable member is scarred, it swells around the scar in its outer surface. In the case where the movable member has a scar and a swollen portion therearound in its outer surface, the frictional force produced between the movable member and the chip increases, which leads to needing a greater operational force of the movable-member moving device. In addition, in the case where either the movable member or the ram has a swollen portion around a scar in its outer surface, it may have, at the end of the outer surface, a projecting portion, which may damage an inner surface of the ram-receive hole or an inner surface of the movable-member-receive hole. In a particular case where the amount of projection of the projecting portion from the outer surface exceeds a clearance provided between the movable member and the movable-member-receive hole, or a clearance provided between the ram and the ram-receive hole, the resistance to the movement of the movable member relative to the movable-member-receive hole, or the resistance to the movement of the ram relative to the ram-receive hole excessively increases, which leads to even stopping the movement of the movable member by the movable-member moving device of a small size.

SUMMARY OF THE INVENTION

It is therefore an object of the present invention to provide a chip compressing apparatus which does not need a great operation force of a movable-member moving device, i.e., can employ a movable-member moving device of a small size.

The present invention provides a chip compressing apparatus which has one or more of the technical features that are described below in respective paragraphs given parenthesized sequential numbers (1) to (15). Any technical feature which includes another technical feature shall do so by referring, at the beginning, to the parenthesized sequential number given to that technical feature. Thus, two or more of the following technical features may be combined, if appropriate. Each technical feature may be accompanied by a supplemental explanation, as needed. However, the following technical features and the appropriate combinations thereof are just examples to which the present invention is by no means limited.

(1) According to a first feature of the present invention, there is provided a chip compressing apparatus, comprising a housing which has an inner space having opposite open ends; a movable member which is movable, along one of the opposite open ends of the housing, to a closing position where the movable member closes the one open end of the housing and to an opening position where the movable member opens the one open end; a movable-member moving device which moves the movable member to the closing position and to the opening position; a compressing ram which is inserted in the inner space of the housing through the other open end thereof, such that the compressing ram is movable in an axial direction of the housing; a ram moving device which moves the compressing ram in the axial direction so that the ram cooperates with the housing and the movable member being positioned at the closing position to compress metallic chip which is stored in the inner space of the housing; and a supporting device which supports the housing and the movable member such that at least when the compressing ram compresses the metallic chip, the housing and the movable member are not separated from each other, and at least when the movable member is moved from the closing position thereof to the opening position thereof, the housing and the movable member are separable from each other. When the housing and the movable member are separated from each other, the housing may be separated from the movable member, or the movable member may be separated from the housing. The housing may be separated from the movable member according to, e.g., the second feature (2) described below. The movable member may be separated from the housing according to, e.g., a feature in which the supporting device comprises a movable-member supporting device which supports the movable member such that when the compressing ram compresses the chip, the supporting device bears the movable member on the back surface thereof remote from the ram and does not allow the movable member to be moved back, and when the compressed chip is discharged, the supporting device allows the movable member to be moved back. The direction of movement of the compressing ram may be vertical, horizontal, or any other direction. However, for the purpose of storing the chip in the housing, it is preferred that the movement direction have a component parallel to a vertical direction, and it is most preferred that the movement direction be a vertical direction. In the present chip compressing apparatus, when the compressing ram compresses the chip, the movable member is positioned at the closing position and, in this state, the ram is advanced and cooperates with the housing and the movable member to compress the chip present between the ram and the movable member. In this step, the supporting device does not allow the separation of the housing and the movable member, which leads to preventing the chip from entering a space which would otherwise be produced between the movable member and the end surface of the housing. After the compressing, the ram moving device removes its drive force off the ram, or retracts the ram away from the compressed chip. Subsequently, the movable member is moved from the closing position to the opening position, thereby permitting the compressed chip to be pushed out of the housing by the advancement of the ram. When the movable member is moved to the opening position, the supporting device allows the housing and the movable member to be separated from each other, the force of the compressed chip to press the movable member is reduced, or zeroed, which leads to helping the movable member be moved to the opening position. Since the housing and the movable member are separable from each other, a spring back (i.e., expansion) of the compressed chip is allowed by the separation of the housing and the movable member, when the ram is retracted and is moved away from the compressed chip. Thus, the force of the compressed chip to press the movable member is reduced, and the force exerted in a direction to resist the movement of the movable member is reduced. Accordingly, the present chip compressing apparatus needs only a small operation force of the movable-member moving device and can employ a movable-member moving device of a small size. As the amount of chip compressed increases, the spring back of the compressed chip increases. However, as the spring back of the compressed chip increases, the amount of separation of the housing and the movable member increases, which results in sufficiently reducing the force of the compressed chip to press the movable member.

(2) According to a second feature of the present invention that includes the first feature (1), the supporting device comprises a main frame which supports the ram moving device and which supports the movable member on one of opposite sides of the movable member, the one side being more distant from the housing than the other side; a housing attaching device which attaches the housing to the main frame such that the housing is separable from the movable member; and a biasing device which biases the housing in a direction toward the movable member. The biasing device may press the housing against the movable member, so that the movable member is elastically sandwiched between the housing and the main frame, or alternatively may press the housing directly against the main frame while a clearance is left between the housing and the movable member. The biasing device may be provided by, e.g., the self weight of the housing, or alternatively an elastic member according to the third feature (3) described below. In the former case, the magnitude of the biasing force of the biasing device is defined by the self weight of the housing. Otherwise, the biasing device may comprise an air-pressure-operated cylinder device. Since air is compressible, the supply of air to an air chamber of the cylinder device results in biasing the housing in a direction toward the movable member and, when the movable member is moved to the opening position, the housing can be separated the movable member while compressing the air in the air chamber. In the present chip compressing apparatus, when the compressing ram is advanced to compress the chip, the housing is pressed toward the movable member with a force equal to the sum of the frictional force produced between the chip and the housing and the biasing force of the biasing device. Thus, the housing is prevented from being separated from the movable member because of the force produced by the chip being compressed, and accordingly the chip is prevented from entering a space which would otherwise be produced between the movable member and the end surface of the housing. Thus, even if the biasing force of the biasing device may be small, the housing is prevented from being separated from the movable member, when the ram compresses the chip. When the compressing ram removes its compressing force off the chip, or is retracted away from the chip after the compression of the chip, the compressed chip exhibits a spring back, which results in retracting the housing against the biasing force of the biasing device. This retraction of the housing stops at the position where the spring-back force of the compressed chip is counterbalanced by the biasing force of the biasing device. Thus, the force of the compressed chip to press the movable member becomes equal to the biasing force of the biasing device. Since the biasing force of the biasing device can be small without any problems as described above, the force of the chip to press the movable member can be small, which leads to reducing the frictional force produced between the movable member and the chip or the main frame, and downsizing the movable-member moving device. However, it is not desirable that when the ram is retracted, the housing be moved with the ram because of the frictional force produced between the ram and the housing. Hence, it is preferred that the biasing force of the biasing device be greater than this frictional force.

(3) According to a third feature of the present invention that includes the second feature (2), the biasing device comprises an elastic member which is provided between the main frame and the housing.

(4) According to a fourth feature of the present invention that includes the second or third feature (2) or (3), the movable member is elastically sandwiched, based on a biasing force of the biasing device, between the housing and a portion of the main frame that supports the movable member. In the present chip compressing apparatus, when the chip is compressed, the housing is pressed against the movable member, so that no space is produced between the movable member and the end surface of the housing. Thus, the chip is prevented from entering the space which would otherwise be produced between the movable member and the end surface of the housing. Even if, when the chip is compressed, the main frame may be elastically deformed in a direction away from the housing and the movable member may be moved to follow the deformation of the main frame, the housing can be moved to follow the movable member, because of the biasing force of the biasing device and the frictional force produced between the chip and the housing. Thus, no space is produced between the movable member and the end surface of the housing. When the movable member is moved from the closing position to the opening position, the spring back of the compressed chip causes the housing to be separated from the movable member, which leads to reducing a frictional resistance exerted to the movable member and thereby allowing an easy movement of the movable member. In case some amount of chip enters a space which is produced between the movable member and the end surface of the housing for some reason, the frictional resistance to the movable member can be reduced in contrast to the prior chip compressing device wherein it cannot be reduced. Thus, the present chip compressing apparatus can employ a movable-member moving device of a small size. In addition, even if the movable member may be moved in the state in which some chip is sandwiched between the movable member and the end surface of the housing, the movable member or the end surface of the housing is not scarred. It is preferred to increase the degree of hardness of each of respective contact surfaces of the movable member and the housing. For example, a lining formed of a material having a high degree of hardness may be fixed to each of the respective contact surfaces, or each contact surface may be heat treated to increase the degree of hardness thereof. Moreover, at a time different from the time of compressing of the chip, the movable member may be moved to a position where the movable member is completely away from the housing and a chip removing device removes the chip which had been sandwiched between the movable member and the housing. In the case where the biasing device comprises an air-pressure-operated cylinder device, the cylinder device may be provided by a double-action-type one. In the last case, when the chip is compressed, the double-action-type cylinder device biases the housing in the direction toward the main frame; and when the chip is not compressed, the cylinder device biases the housing in the direction away from the main frame, so that a space is forcedly produced between the housing and the movable member and a blowing-off device blows air into the space, thereby blowing off the chip trapped between the housing and the movable member.

(5) According to a fifth feature of the present invention that includes any one of the second to fourth features (2) to (4), the main frame comprises a plurality of guide rods which cooperate with each other to support the housing such that the housing is movable in the axial direction thereof. In the present chip compressing apparatus, the guide rods cooperate with each other to position the housing in a direction perpendicular to the axial direction of the housing, and allow the housing to be moved in only the axial direction thereof.

(6) According to a sixth feature of the present invention that includes the fifth feature (5), the biasing device comprises an elastic member which is provided between the housing and each of at least two of the guide rods. For example, the guide rods may include respective head portions, or may be provided with respective support members (e.g., stop rings) attached thereto, and each of a plurality of elastic members may be provided between the housing and a corresponding one of the guide rods. In this case, the guide rods function as not only guide members for guiding the housing, but also support members for supporting the elastic members. The present chip compressing apparatus can enjoy a simplified construction.

(7) According to a seventh feature of the present invention that includes the sixth feature (6), each of the elastic members comprises a coned disc spring which is provided around a corresponding one of the guide rods. The coned disc springs can be very easily provided.

(8) According to an eighth feature of the present invention that includes any one of the first to seventh features (1) to (7), the movable member has a through-hole which extends substantially parallel to the axial direction of the housing and which has a cross section greater than a cross section of the inner space of the housing, and when the movable member is positioned at the opening position, the through-hole of the movable member is aligned with the inner space of the housing. In the present chip compressing apparatus, when the chip is compressed, a portion of the movable member that is free from the through-hole is position at a first position where that portion closes the open end of the inner space of the housing and, after the compressing, a portion of the movable member that defines the through-hole is moved to a second position where the through-hole is opposed to the open end. The first position corresponds to the closing position, and the second position corresponds to the opening position. If the compressing ram is advanced in the state in which the through-hole is opposed to the open end of the housing, the compressed chip is pushed into the through-hole. When the movable member is positioned at the closing position, the compressed chip may be discharged into an external space because the though-hole is made free from the main frame, or because the through-hole is communicated with a chip-discharge passage of the main frame. Alternatively, the main frame may have a passage which is concentric with the open end of the housing, so that the compressed chip pushed from the housing is directly discharged into an external space through the through-hole of the movable member and the passage of the main frame. In the present chip compressing apparatus, even in the state in which the movable member is positioned at the opening position, the portion of the movable member that defines the through-hole can support the end surface of the housing. Thus, even if the end surface of the housing is pressed against the movable member, the housing is prevented from being inclined. However, employing the movable member having the through-hole is not essentially required for discharging the compressed chip. For example, in the case where the movable member is completely away from the open end of the housing in the state in which the movable member is positioned at the opening position, the compressed chip can be discharged from the housing by just advancing the compressing ram in that state. In that state, however, the movable member cannot help eccentrically supporting the housing, so that the housing is inclined. In contrast, since the present chip compressing apparatus employs the movable member having the trough-hole, the movable member can support the housing all around the open end thereof, thereby preventing the housing from being inclined. In the case where the movable member has no through-hole, the compressed chip may be discharged into the external space in a direction parallel to the axial direction of the housing, by advancing the compressing ram in the state in which the movable member is positioned at the opening position, or alternatively by first advancing the ram to push the compressed chip from the housing onto the main frame and subsequently moving the movable member to a chip discharging position to discharge the chip from the main frame. In the latter case, the chip is discharged in a direction perpendicular to the axial direction of the housing. The chip discharging position may be the same as, or different from, the closing position. Each of the eighth and ninth features (8), (9) may be embodied independent of one or more of the first to seventh features (1) to (7).

(9) According to a ninth feature of the present invention that includes the eighth feature (8), the supporting device has, in a portion thereof corresponding to the through-hole of the movable member being positioned at the opening position, a chip discharging passage which permits the compressed metallic chip to pass therethrough. In this case, the compressed chip is pushed into the chip discharging passage via the through-hole by the advancement of the compressing ram, and subsequently the chip is discharged from the passage into a chip receptacle, a chip-conveying vehicle, or a chip-conveying belt conveyor.

(10) According to a tenth feature of the present invention that includes any one of the first to ninth features (1) to (9), the chip compressing apparatus further comprises an excessive-advancement detecting device which detects, when the compressing ram compresses the metallic chip stored in the inner space of the housing, that the ram has been excessively advanced to a predetermined limit position; and a controller which controls, when the excessive-advancement detecting device detects that the compressing ram has been excessively advanced, the ram moving device at least to stop the advancement of the ram. If there is an amount of chip enough to be compressed in the housing, the compressing ram is prevented by the compressed chip from being advanced to the predetermined limit position. The limit position is predetermined at an intermediate position between a first position where the ram directly presses the movable member via no amount of chip stored in the housing, or indirectly presses the movable member via only a small amount of chip stored in the housing, so that both the ram and the movable member are damaged, and a second position where the ram contacts too much amount of chip stored in the housing and cannot compress the chip. In the present chip compressing apparatus, the excessive-advancement detecting device detects, when the ram compresses the chip stored in the housing, that the ram has been excessively advanced to the limit position, and the controller controls, when the excessive-advancement detecting device detects that the ram has been excessively advanced, the ram moving device to stop the advancement of the ram. Therefore, the present apparatus prevents the ram from pressing the movable member via no or little amount of chip, or via a shot ball or a broken piece of a tip of a cutting tool. Thus, the ram and the movable member are prevented from being scarred or being swollen around each scar. Since the ram is free from the problem that one or more swollen portions around one or more scars radially outward project, the ram is prevented from damaging the inner surface of the housing or being made immovable relative to the housing. In the case where the limit position is predetermined at a position nearer to the above-indicated first position than to the second position, the compressing ram can be prevented from being advanced to exceed the limit position, even if the amount of chip stored in the housing may be small. Thus, the controller can be said as a means for preventing the ram from "compressing the air". However, the amount of chip stored in the housing may vary, small and large, which leads to varying the size of the compressed chip. On the other hand, in the case where the limit position is predetermined at a position nearer to the above-indicated second position than to the first position, the ram can not only be prevented from "compressing the air", but also can compress respective amounts of chip stored in the housing, into compressed chip blocks having a generally constant size, because the ram can compress the respective amounts of chip each near to a maximum or upper-limit amount of chip that is allowed to be stored in the housing. In the latter case, the controller can be said as a means for providing compressed chip blocks having a generally constant size. The controller may be modified such that the modified controller control, when the excessive-advancement detecting device detects that the ram has been excessively advanced, the ram moving device to not only stop the advancement of the ram but also retract the ram to an advancement starting position thereof.

(11) According to an eleventh feature of the present invention, there is provided a chip compressing apparatus, comprising a housing which has an inner space having opposite open ends; a movable member which is movable, along one of the opposite open ends of the housing, to a closing position where the movable member closes the one open end of the housing and to an opening position where the movable member opens the one open end; a movable-member moving device which moves the movable member to the closing position and to the opening position; a compressing ram which is inserted in the inner space of the housing through the other open end thereof, such that the compressing ram is movable in an axial direction of the housing; a ram moving device which moves the compressing ram in the axial direction so that the compressing ram cooperates with the housing and the movable member being positioned at the closing position to compress metallic chip which is stored in the inner space of the housing; an excessive-advancement detecting device which detects, when the compressing ram compresses the metallic chip stored in the inner space of the housing, that the ram has been excessively advanced to a predetermined limit position; and a controller which controls, when the excessive-advancement detecting device detects that the compressing ram has been excessively advanced, the ram moving device at least to stop the advancement of the ram. The present chip compressing apparatus can enjoy the same advantages as those of the apparatus in accordance with the tenth feature (10) described above.

(12) According to a twelfth feature of the present invention that includes the eleventh feature (11), the excessive-advancement detecting device comprises a ram-compressing detecting device which detects that the compressing ram is compressing the metallic chip stored in the inner space of the housing; and a limit-position-reaching detecting device which detects, when the ram-compressing detecting device is detecting that the compressing ram is compressing the metallic chip, that the ram has reached the predetermined limit position. For example, when the compressed chip is discharged from the housing by the advancement of the compressing ram, it is natural that the ram should pass through the predetermined limit position. This passing of the ram through the limit position is not an abnormal one because it occurs after the chip is compressed in a normal manner. However, it is abnormal that the ram reaches the limit position when the ram-compressing detecting device is detecting that the compressing ram is compressing the chip. Thus, the present chip compressing apparatus is prevented from detecting an abnormality, that is, making an incorrect judgment when the chip is compressed in a normal manner.

(13) According to a thirteenth feature of the present invention that includes the twelfth feature (12), the limit-position-reaching detecting device comprises a detectable member which is movable with the compressing ram; and a detector which detects that the detectable member has been moved to a position corresponding to the predetermined limit position of the ram. According to this feature, the limit-position-reaching detecting device can accurately detect that the ram has reached the limit position. However, the limit-position-reaching detecting device may be provided by a device which indirectly detects that the ram has reached the limit position, e.g., the combination of a flow-amount meter which measures an amount of working fluid flowing into a hydraulic cylinder device which drives or operates the ram, and an estimating device which estimates, based on the flow amount measured by the flow-amount meter, that the ram has reached the limit position; or the combination of a movement-amount sensor which measures an amount of movement of the ram or a drive member of the ram moving device and an estimating device which estimates, based on the movement amount measured by the movement-amount sensor, that the ram has reached the limit position. The detectable member and the detector may be provided by a dog and a limit switch, respectively, or by a light reflecting plate and a reflection-type photoelectric switch, respectively. The combination of the dog and the limit switch is a sort of contact-type detecting device, and the combination of the light reflecting plate and the reflection-type photoelectric switch is a sort of non-contact-type detecting device. The reflection-type photoelectric switch may be replaced with a transmission-type photoelectric switch which includes a light emitter and a light receiver. In the last case, a shade member may be provided on the ram, such that just at the time when the ram reaches the limit position, the shade member starts to shade the light emitted from the light emitter and thereby prevent the light from being received by the light receiver, or starts to allow the light emitted from the light emitter to be received by the light receiver.

(14) According to a fourteenth feature of the present invention that includes the twelfth feature (12), the limit-position-reaching detecting device comprises a compressing-time measuring device which measures a time for which the ram moving device moves the compressing ram to compress the metallic chip; and a load detecting device which detects a load exerted to the ram moving device, the controller controlling the ram moving device at least to stop the advancement of the ram, when the time measured by the compressing-time measuring device exceeds a predetermined time before the load detecting device detects a load not smaller than a predetermined load. The predetermined time corresponds to the predetermined limit position. If the compressing ram starts compressing an amount of chip stored in the housing, the load exerted to the ram moving device starts increasing. The smaller the amount of the chip stored is, the longer the time from the start of advancing of the ram to the start of increasing of the load is. Therefore, if the time measured by the compressing-time measuring device exceeds a predetermined time before the load detecting device detects a load not smaller than a predetermined load, the controller can judge that there is only a small amount of chip stored in the housing, or there is no amount of chip. Thus, the controller controls the ram moving device to stop further advancement of the ram, thereby preventing the ram and the movable member from being damaged. The predetermined time is intermediate between a first time over which the ram will be advanced to "compress the air" and a second time under which the ram will contact too much amount of chip larger than a maximum or upper-limit amount of chip that is allowed to be stored in the housing and accordingly the ram cannot compress the chip. The predetermined load is smaller than a maximum or upper-limit load that is needed to compress the chip and greater than a load that can be said to be able to apply a substantial pressure to the chip. The longer the predetermined time is, the less likely the time measured by the compressing-time measuring device exceeds the predetermined time before the load detecting device detects a load not smaller than the predetermined load, even if only a small amount of chip may have been stored in the housing. Therefore, the controller less likely controls the ram moving device to stop the advancement of the ram. However, if the amount of chip stored in the housing varies or fluctuates, then the size of chip block obtained by compressing the amount of chip will fluctuate. In the case where the predetermined time is short and the controller has the function of repeating such a control manner that when it controls the ram moving device to stop the advancement of the ram, it further controls, after an additional amount of chip is stored in the housing, the same device to retract and advance the ram once more to compress the thus increased amount of chip, the chip compressing apparatus can provide compressed chip blocks having a generally uniform size. Since the predetermined time is short, the amount of chip for which the time measured by the measuring device exceeds the predetermined time before the load detecting device detects a load not smaller than the predetermined load, is limited to a range around the maximum amount of chip that is allowed to be stored in the housing. If the predetermined load is too small, a chip compressing operation might be erroneously performed when, in fact, the compressing ram has not contacted the chip stored in the housing, for example, in the case where the controller might erroneously judge that the ram has contacted the chip, because of signal errors and/or disturbances. On the other hand, if the predetermined load is great, the load exerted to the ram moving device does not reach the predetermined load before the ram compresses the chip to a considerable extent. Therefore, after the load exerted to the ram moving device has reached the predetermined load, subsequent compression of the chip does not reduce the size of the finally obtained compressed chip block so much. Thus, for the purpose of providing compressed chip blocks having a generally uniform size, it is preferred that the predetermined load be great. However, if the predetermined load is too great, the controller might often stop a chip compression operation after the operation has been carried out to a considerable extent. This would waste much time and much energy. Thus, the predetermined time should be predetermined while taking those factors into account. As is apparent from the above description, the predetermined time and the predetermined load should be predetermined depending upon whether just the first problem of "compressing the air" should be solved or not only the first problem but also the second problem of providing compressed chip blocks having a generally uniform size should be solved. In the case where the second problem of providing compressed chip blocks having a generally uniform size should be solved, the chip compressing apparatus may employ, in addition to, or in place of, the excessive-advancement detecting device and the ram-advancement stopping controller, a chip-amount measuring device which measures an amount of chip supplied to the housing via a chip-supply passage, and a ram-advancement starting controller which controls, when the amount of chip measured by the chip-amount measuring device exceeds a predetermined value, the ram moving device to start the advancement of the ram. In the last case, a chip conducting passage connected to a chip separating device or a chip introducing passage connected to the chip compressing apparatus may be partly formed of a transparent material, and the chip-amount measuring device may be provided by a device which optically detects an amount of chip passing through the transparent portion of the passage and sums up the detected amounts.

(15) According to a fifteenth feature of the present invention that includes any one of the eleventh to fourteenth features (11) to (14), the controller comprises a chip-discharging control portion which controls, when the compressing ram discharges the compressed metallic chip from the inner space of the housing, the ram moving device to continue the advancement of the ram for a predetermined time after the excessive-advancement detecting device detects that the ram has reached the predetermined limit position, and thereby causes a chip-compressing end portion of the ram to be projected out of the one open end of the housing. Since the chip-compressing end portion of the compressing ram is projected out of the open end of the housing, the chip can be discharged with reliability. On the other hand, if the end portion of the ram is not advanced to be projected out of the housing and accordingly any portion of the compressed ship that is near to the ram is left inside the housing, the frictional force produced between the housing and that portion of the chip resists the discharging of the chip from the housing. The tenth feature (10) may be combined with one or more of the twelfth to fifteenth features (12) to (15).

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIGS. 9A, 9B, and 9C are views for explaining the manner in which the chip compressing device prevents "compressing the air";

DETAILED DESCRIPTION OF THE PREFERRED EMBODIMENTS

Hereinafter, there will be described a lathe 11 including a chip compressing device 48 (FIG. 3) to which the present invention is applied, by reference to the drawings.

Figure 1:
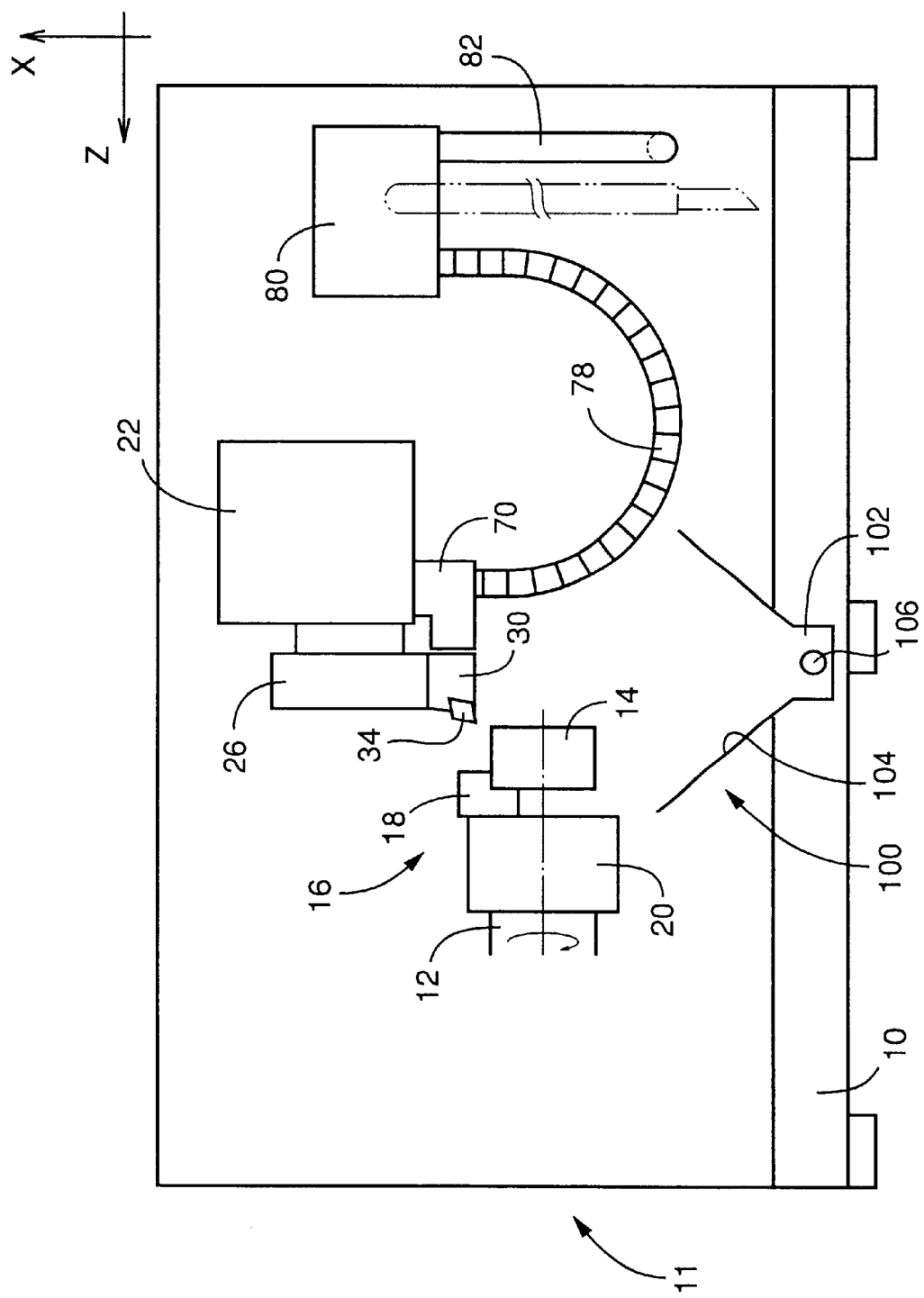
FIG. 1 is an illustrative front elevation view of a lathe including a chip compressing device to which the present invention is applied.

In FIG. 1, reference numeral 10 designates a base frame of the lathe 11. A main-shaft support (not shown) which is provided on the base frame 10 supports a main shaft 12 such that the main shaft 12 is rotatable about a horizontal axis line. A chuck 16 which is for holding a workpiece 14 is attached to an end portion of the main shaft 12, such that the chuck 16 holding the workpiece 14 is rotatable with the main shaft 12. In the present embodiment, the chuck 16 is provided by a three-claw chuck including a base member 20 and three claws 18 (only one claw 18 is shown in FIG. 1) which are equiangularly spaced from one another and which are movable axis-symmetrically with respect to the base member 20.

The lathe 11 further includes a turret 22 opposite to the chuck 16. The turret 22 is moved by a turret moving device 24 (FIG. 7) in a Z direction as a horizontal direction parallel to the central axis line of the main shaft 12, and an X direction as a vertical direction perpendicular to the Z direction. The turret 22 holds a cutting-tool support 26 to the outer peripheral portion of which a plurality of cutting tools 30 (only one cutting tool 30 is shown in FIG. 1) are attached. The cutting-tool support 26 is clamped and unclamped by a clamping device which is provided inside the turret 22. In the state in which the cutting-tool support 26 is unclamped, the support 26 is rotatable relative to the turret 22 and, as the support 26 is rotated by incremental angles by a cutting-tool-support rotating device (not shown), the cutting tools 30 are sequentially positioned at an operative position where one of the cutting tools 30 works or machines the workpiece 14. In the state in which the cutting-tool support 26 is clamped, the cutting tool 30 being positioned at the operative position is not rotatable relative to the turret 22. As shown in 1, each cutting tool 30 is provided with a tip 34 whose cutting face is protected by a cover member (not shown).

When one of the cutting tools 30 is positioned at the operative position and is moved along a cutter pass by the turret moving device 24 and simultaneously when the workpiece 14 is rotated, the outer circumferential surface of the workpiece 14 is cut by the one cutting tool 30, and metallic chip is produced from the workpiece 14. In the present embodiment, the lathe 11 performs a dry cutting in which no cutting fluid is used. The metallic chip is treated by a chip treating device 40.

Figure 3:
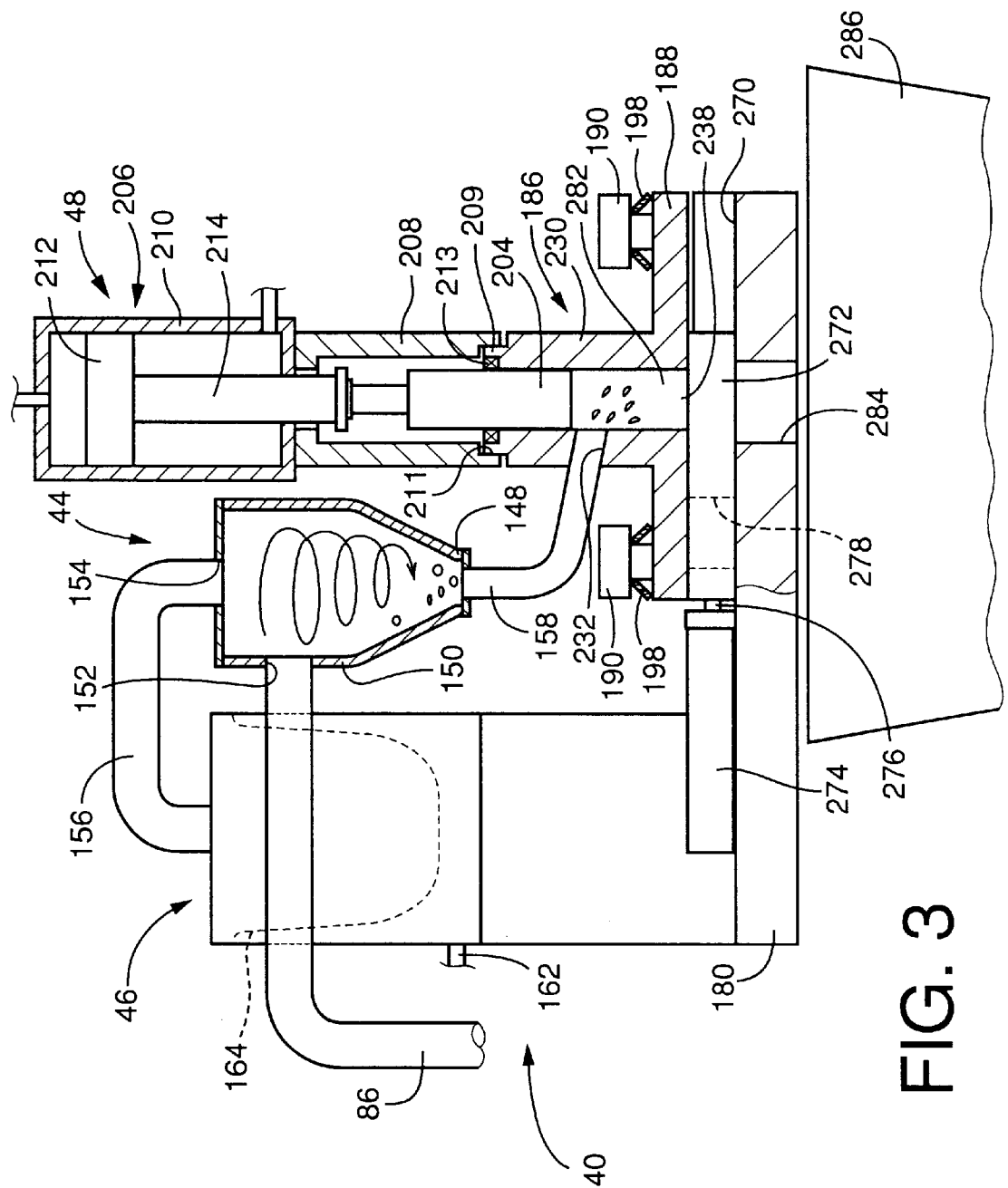
FIG. 3 is an illustrative view of the chip compressing device, a separating device, and a filter device of the lathe of FIG. 1.

As shown in FIG. 3, the chip treating device 40 includes a suction device 42 (FIG. 4), a separating device 44, a filter device 46, and a chip compressing device 48. Each of the devices 42, 44, 46, 48 will be described in detail below.

Figure 2:
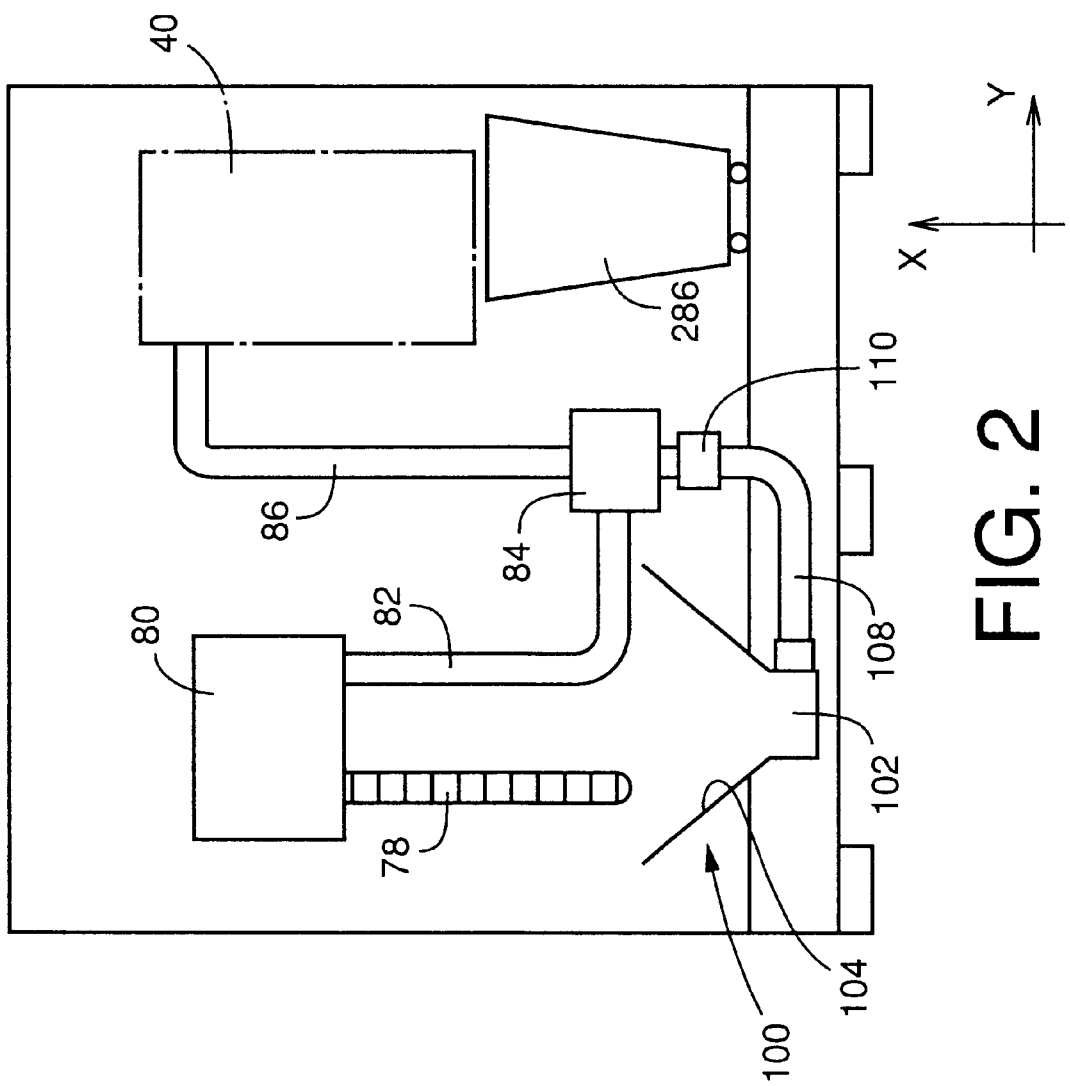
FIG. 2 is a right-hand side elevation view of the lathe of FIG. 1.
Figure 4:
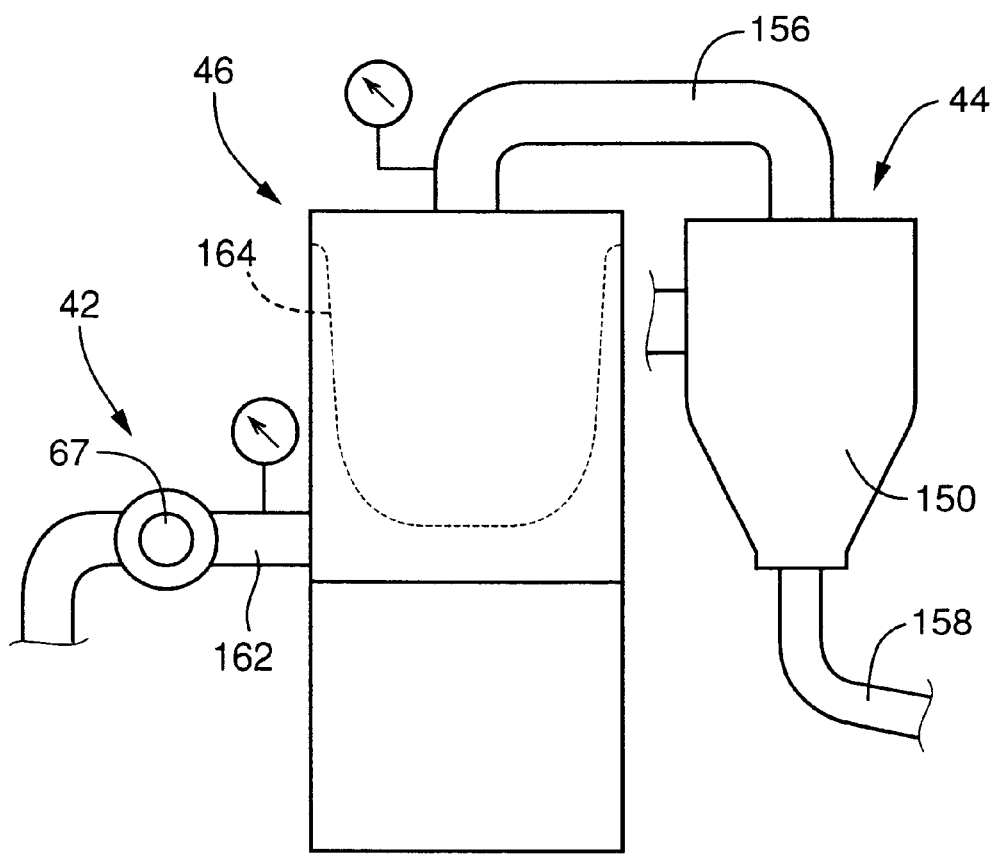
FIG. 4 is an illustrative view of the separating device, the filter device, a suction device which cooperate with the chip compressing device to provide a chip treating device of the lathe of FIG. 1.

As shown in FIG. 4, the suction device 42 includes a vacuum pump 67 and a pump motor 68 (FIG. 7) which drives the vacuum pump 67. In the state in which one cutting tool 30 is positioned at the operative position, the space between the tip 34 of the one cutting tool 30 and the cover member communicates with the suction device 42 via a main suction passage. As shown in FIGS. 1 and 2, the main suction passage includes a passage provided in the cover member; a joint 70 provided at a position corresponding to the operative position of the turret 22; a hose 78 whose one end is connected to the joint 70; a joint 80 connected to the other end of the hose 78; a pipe 82 connected to the joint 80; a joint 84 connected to the pipe 82; and a pipe 86 connected to the joint 84. Since the space between the tip 34 and the cover member communicates with the suction device 42 via the main suction passage, air is caused to flow in that space and accordingly the chip is sucked with the air. The hose 78 is provided by a flexible metallic hose formed of, e.g., stainless steel, and can be deformed to follow the movement of the turret 22.

A metallic chip receptacle 100 is provided below the position where the workpiece 14 is worked or machined. The chip receptacle 100 has a generally conical shape whose diameter decreases in a direction toward a bottom portion 102 thereof. The chip receptacle 100 receives or collects the chip that is not sucked into the cover member. The chip that is not sucked into the cover member falls on a conical surface 104 of the chip receptacle 100, and moves downward because of its own weight. The bottom portion 102 has an opening 106 to which a pipe 108 (FIG. 2) is connected. Since the pipe 108 is connected to the pipe 86 via the joint 84, a secondary suction passage provided by the pipe 108 communicates with the suction device 42, so that the chip received by the chip receptacle 100 is sucked with the air flown in the receptacle 100.

The amount of chip received by the chip receptacle 100 relative to the entire amount of chip produced by the lathe 11 is only several percent. Thus, it is not needed for the pipe 108 to be always communicated with the suction device 42. Therefore, an open-and-close valve device 110 is provided midway in the pipe 108. The valve device 110 is selectively switched, by power, to a connecting state in which the valve device 110 connects the pipe 108 to the suction device 42 and to a disconnecting state in which the valve device 110 disconnects the pipe 108 from the suction device 42. The chip receptacle 100 additionally receives the lubricant oil falling from slides, etc. The chip receptacle 100 includes a separating portion (not shown) for separating the lubricant oil from the chip. Thus, the lubricant oil is prevented from being sucked with the chip.

As shown in FIG. 3, the separating device 44 and the filter device 46 are provided between the pipe 86 and the suction device 42.

The separating device 44 is provided by a cyclone separator which includes a main member 150 having a cylindrical portion and a conical portion whose diameter decreases in a direction toward a lower end 148. The cylindrical portion of the main member 150 has an inlet 152 at a position radially away from the central axis line of the member 150. The pipe 86 is connected to the inlet 152, such that the pipe 86 extends along a tangential line to the cylindrical portion. The main member 150 has an outlet 154 provided at the center of an upper end thereof. The outlet 154 is connected to the filter device 46 via a pipe 156. Therefore, in an inner space of the main member 150, there is always an air flow that first swirls along an inner circumferential surface of the member 150 and then moves up through the central portion of the inner space of the same 150. Simultaneously, the chip moves downward to the lower end 148, because of the centrifugal force and gravity exerted thereto, while swirling along the inner circumferential surface of the main member 150. The chip thus separated from the air is introduced into the chip compressing device 48 via an introduction passage 158 which is connected to the lower end 148 of the main member 150 and is inclined downward. The introduction passage 158 is provided by a flexible metallic hose formed of, e.g., stainless steel.

As shown in FIG. 4, the filter device 46 is provided between the separating device 44 and the suction device 42. An upstream-side portion of an inner space of the filter device 46 is connected to the separating device 44 via a pipe 156, and a downstream-side portion of the inner space is connected to the suction device 42 via a pipe 162. The filter device 46 includes a filter member 164 which separates the upstream-side and downstream-side inner spaces from each other. The filter member 164 removes foreign matters included in the air conducted through the pipe 156.

Figure 5:
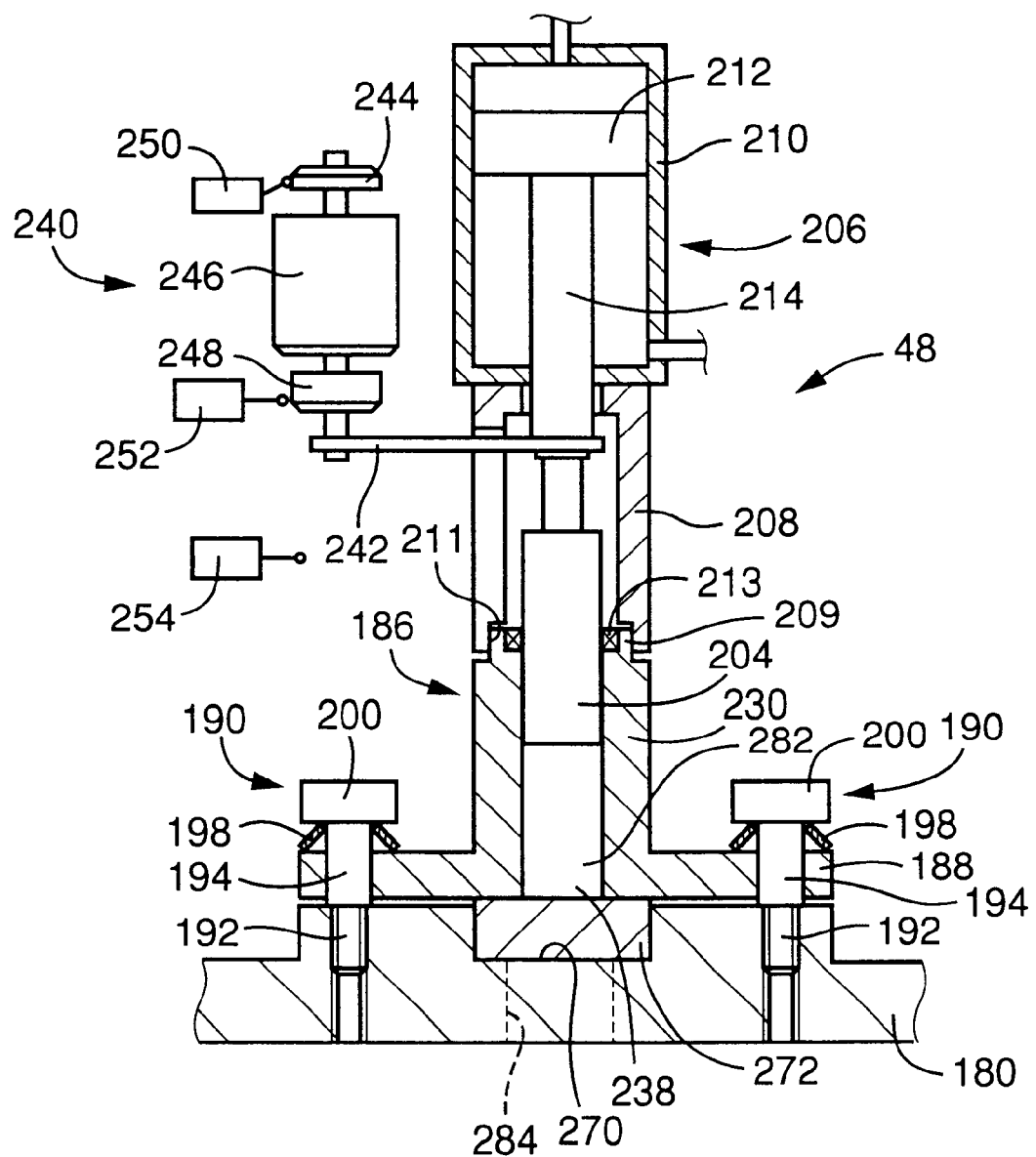
FIG. 5 is a cross-sectioned, side elevation view of the chip compressing device.

The chip compressing device 48 can compress different sorts of chip that have different natures, e.g., have different shapes, have different sizes, and/or are produced from different metallic materials. As shown in FIG. 3, the chip compressing device 48 includes a main frame 180 which is provided on the base frame 10 such that the main frame 180 extends horizontally. A housing 186 is attached to the main frame 180 such that the housing 186 is separable from the main frame 180. The housing 186 has a cylindrical shape and opens at opposite ends thereof. The housing 186 has an annular flange 188 which radially outwardly extends from the lower one of axially opposite end portions of the housing 186. As shown in FIG. 5, the flange 188 is supported on the main frame 180, such that the central axis line of the housing 186 extends vertically, and it is attached to the main frame 180 with a plurality of bolts 190 (in the present embodiment, three bolts 190), such that the housing 186 is separable from the main frame 180.

As shown in FIG. 5, the three bolts 190 have respective threaded portions 192 which are screwed into the main frame 180 such that the three bolts 190 are equiangularly spaced from one another about the central axis line of the housing 186. The three bolts 190 additionally have respective axial portions 194 which extend through the flange 188 of the housing 186, such that the flange 188 or the housing 186 is movable relative to the bolts 190 in an axial direction parallel to the central axis line of the housing 186. A coned disc spring 198 as a sort of elastic member is provided around a projecting portion of the axial portion 194 of each bolt 190 that projects from the flange 188 of the housing 186. Each of the three disc springs 198 is sandwiched between the flange 188 and a head portion 200 of a corresponding one of the three bolts 190, and the disc springs 198 cooperate with one another to bias the flange 188 or the housing 186 in a direction toward the main frame 180.

A chip compressing ram 204 is inserted in an inner cylindrical space of the housing 186, through the upper one of the opposite open ends of the housing 186 that is distant from the main frame 180, such that the compressing ram 204 is movable in the axial direction of the housing 186. The compressing ram 204 has a circular cross section, and is advanced and retracted, i.e., is reciprocated upward and downward, by a hydraulic cylinder device 206. The hydraulic cylinder device 206 is supported by the main frame 180 via a bracket 208 and a support member (not shown). The housing 186 has a positioning projection 209 which is fitted in a positioning hole 211 of the bracket 208. Thus, the hydraulic cylinder device 206 is located relative to the housing 186 such that the cylinder device 206 is concentric with the housing 186. The positioning projection 209 and the positioning hole 211 provide respective positioning portions of the housing 186 and the bracket 208, which in turn cooperate with each other to provide a positioning device. The compressing ram 204 is sealed by a dust seal member 213 as a sealing device which is supported by the housing 186.

Figure 6:
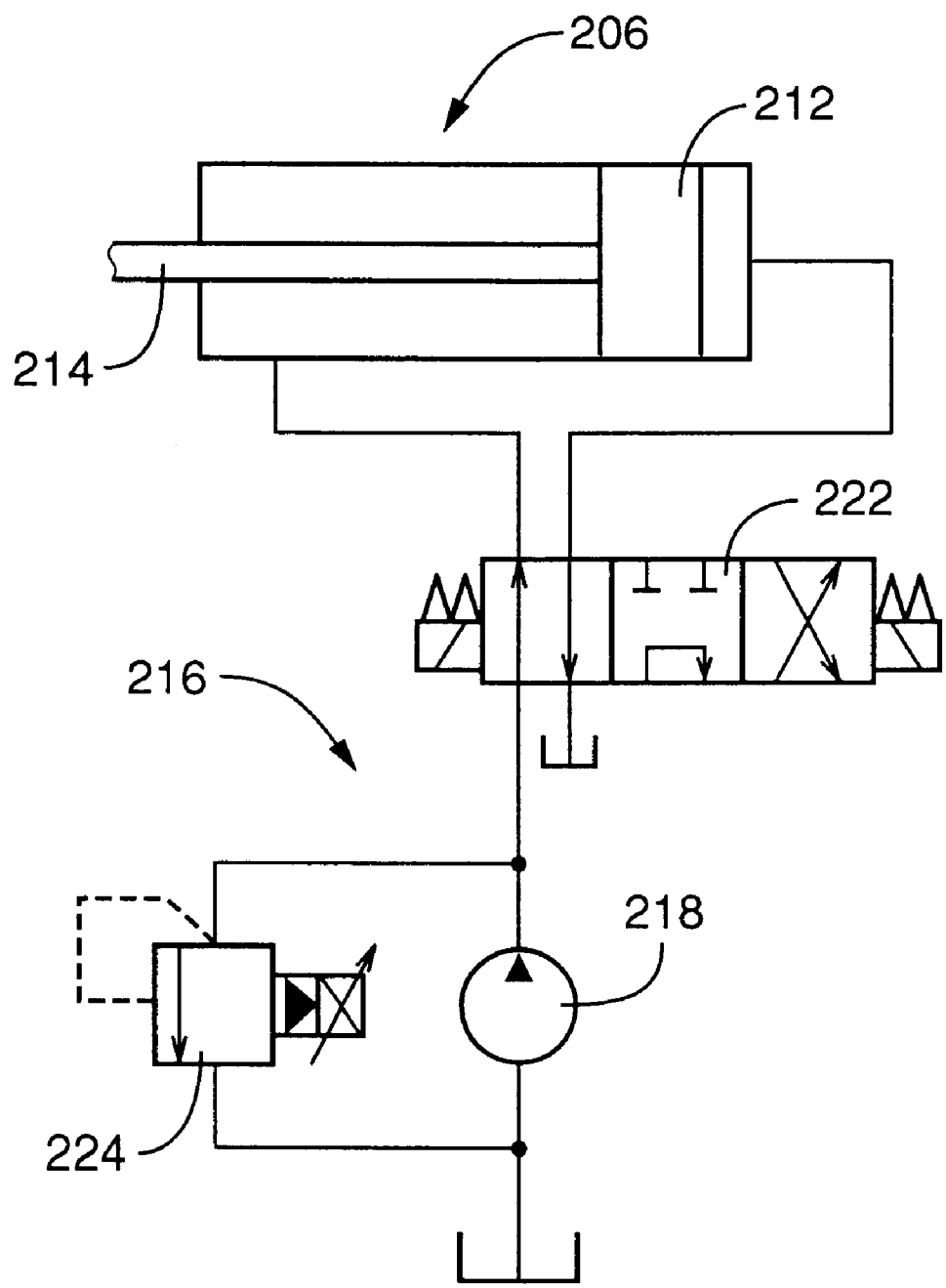
FIG. 6 is a diagrammatic view of a circuit including a hydraulic cylinder device which moves a compressing ram, and a control valve device which controls the cylinder device.

The hydraulic cylinder device 206 includes a cylindrical housing 210, a piston 212 which is slideable in an inner space of the housing 210, and a piston rod 214 which projects from the piston 212 in a direction toward the housing 186. The compressing ram 204 is fixed to the lower end of the piston rod 214. The cylinder device 206 is of a double-action type and, as shown in FIG. 6, is connected to a pump 218 as a pressure source via a fluid passage in which a control valve device 216 is provided.

The control valve device 216 includes a solenoid-operated direction-switch valve 222 and a solenoid-operated proportional relief valve 224 the detailed description of which is omitted because they are well known in the art. In short, the direction-switch valve 222 has two solenoids which are selectively energized to supply a working fluid to a selected one of a piston-side chamber and a rod-side chamber of the cylinder device 206 and permit the working fluid to be discharged from the other chamber, so that the piston 212 or the compressing ram 204 is advanced and retracted, i.e., is moved upward and downward. When the two solenoids of the direction-switch valve 222 are selectively deenergized, the supplying of the working fluid to the selected one of the two chambers of the cylinder device 206 and the discharging of the fluid from the other chamber are stopped, so that the compressing ram 204 is held stopped.

The valve opening pressure of the proportional relief valve 224 can be changed by changing the electric current supplied to the solenoid of the relief valve 224. Therefore, the pressure of the working fluid supplied to the hydraulic cylinder device 206, i.e., the compressing force of the compressing ram 204 can be changed by changing the electric current supplied to the solenoid of the relief valve 224. The compressing force of the ram 204 should be changed depending upon, e.g., the nature of the chip. In the present embodiment, however, the compressing force of the ram 204 is pre-set at the greatest one of various forces needed to compress various sorts of chip. In addition, the compressing force of the ram 204 may be changed depending upon the amount of chip to be compressed. In the present embodiment, however, the compressing force of the ram 204 is not changed depending upon the amount of chip to be compressed, that is, is constant irrespective of the amount of chip to be compressed.

Figure 10A:
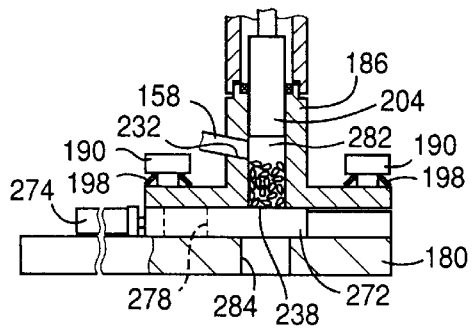
FIGS. 10A, 10B, 10C, 10D, 10E, 10F, 10G, and 10H are views for explaining the manner in which the chip compressing device compresses an amount of chip and discharges a chip block.

The housing 186 has an introduction inlet 232 which is formed through a side wall 230 thereof and which is connected to the introduction passage 158. The chip separated by the separating device 44 is introduced into the housing 186 via the introduction inlet 232, and is accumulated in a lower portion of the inner space of the housing 186. When the compressing ram 204 is not operated, the ram 204 is held at a retracted-end or upper-end position where the ram 204 opens the introduction inlet 232. On the other hand, when the ram 204 is operated, the ram 204 is advanced toward an advanced-end or lower-end position where the ram 204 compresses the accumulated chip into a chip block 236 (FIG. 10). FIG. 10F shows the advanced-end position of the compressing ram 204 where a chip-compressing end portion of the ram 204 projects downward over a small distance from the lower one of the opposite open ends of the housing 186, i.e., a chip-discharge outlet 238. The combined biasing force of the three disc springs 198 that bias the housing 186 toward the main frame 180 is prescribed to be a small force which, however, is greater than the maximum frictional force that is produced between the compressing ram 204 and the housing 186 when the ram 204 is retracted toward the retracted-end position. Thus, the housing 186 does not follow the ram 204 being retracted.

A detecting device 240 detects the current position of the compressing ram 204. As shown in FIG. 5, the detecting device 240 includes three dogs 244, 246, 248 as detectable members which are attached to the piston rod 214 of the hydraulic cylinder device 206 via a support member 242 and which are moved with the compressing ram 204 when the piston rod 214 is advanced and retracted. The detecting device 240 further includes three stationary detectors, i.e., a retracted-end-position switch 250, a ram-compressing switch 252, and a limit-position-reaching switch 254 which are fixed to the main frame 180. Each of the three switches 250, 252, 254 is provided by a limit switch, and generates an ON signal when it is detecting a corresponding one of the three dogs 244, 246, 248 and generates an OFF signal when it is not the one dog 244, 246, 248.

The first dog 244 and the retracted-end-position switch 250 are provided such that when the compressing ram 204 reaches the retracted-end position, the dog 244 causes the switch 250 to produce the ON signal. In the state in which the compressing ram 204 is positioned at the retracted-end position, the piston 212 does not contact the top wall of the cylinder housing 210. The second dog 246 and the ram-compressing switch 252 are provided such that when the compressing ram 204 reaches an introduction-inlet closing position where the chip-compressing end surface of the ram 204 reaches a downstream-side end of the introduction inlet 232 as seen in the direction of advancement of the ram 204 and completely closes the inlet 232, the dog 246 causes the switch 252 to produce the ON signal. The third dog 248 and the limit-position-reaching switch 254 are provided such that when the compressing ram 204 is advanced to a predetermined limit position, the dog 248 causes the switch 254 to produce the ON signal. The limit position is predetermined at such a position which is a small distance back in the direction of retraction of the ram 204 from a position where the ram 204 being advanced directly presses a movable member 272 or indirectly presses the movable member 272 via only a small amount of chip. Thus, the limit position is near to the chip-discharge outlet 238. The second dog 246 is long in the direction of movement of the compressing ram 204 and accordingly continues to cause the ram-compressing switch 252 to produce the ON signal till the ram 204 reaches an advanced-end position thereof. The third dog 248 is also long in the direction of movement of the ram 204 and accordingly continues to cause the limit-position-reaching switch 254 to produce the ON signal till the ram 204 reaches the advanced-end position.

As shown in FIGS. 3 and 5, the main frame 180 has a groove 270 which opens in the upper surface of the frame 180 and which is formed through the frame 180 in a horizontal direction perpendicular to the axial direction of the housing 186. The movable member 272 is fitted in the groove 270 such that the movable member 272 is movable in the groove 270. The movable member 272 has a rectangular cross section, and has a thickness greater than the depth of the groove 270. The movable member 272 is fitted in the groove 270 of the main frame 180, and thus is supported by the main frame 180 on one of opposite sides of the movable member 272 that is distant from the housing 186. The movable member 272 projects upward a small distance from the upper surface of the main frame 180. Therefore, the housing 186 contacts the movable member 272, with a small space or clearance being left between the housing 186 and the main frame 180, and the movable member 272 is elastically sandwiched, based on the biasing force of the disc springs 198, between the housing 186 and a portion of the main frame 180 that supports the movable member 272.

The movable member 272 has an elongate shape, and is connected to a projecting end portion of a piston rod 276 of a hydraulic cylinder device 274 such that the movable member 272 extends parallel to the direction of advancement and retraction of the piston rod 276. The movable member 272 has a cylindrical through-hole 278 formed through the thickness of a portion of the member 272 that is near to the piston rod 276 as seen in the lengthwise direction of the member 272. The through-hole 278 extends parallel to the axial direction of the housing 186, and has a circular cross section greater than that of the inner space of the housing 186.

The hydraulic cylinder device 274 is connected to a pump (not shown) as a pressure source via a control valve device 280 (FIG. 7) which includes a direction-switch valve and a relief valve. The cylinder device 274 moves the movable member 272 to a closing position where a solid portion of the movable member 272 free from the through-hole 278 is opposed to the chip-discharge outlet 238 of the housing 186 and thus the movable member 272 closes the outlet 238, and to an opening position where the through-hole 278 is aligned with the outlet 238 and thus the movable member 272 opens the outlet 238. The movable member 272 being positioned at the closing position cooperates with the housing 186 to define a chip storing space 282.

As shown in FIG. 3, the main frame 180 has a chip-discharge passage 284 which is concentric with the inner space of the housing 186 and has a circular cross section greater than that of the through-hole 278. The chip-discharge passage 284 is formed through the thickness of a portion of the main frame 180 that is aligned with the through-hole 278 of the movable member 272 being positioned at the opening position. A chip conveying vehicle 286 is provided below the lower open end of the chip-discharge passage 284. The chip blocks 236 discharged through the passage 284 are collected by the chip conveying vehicle 286. However, the vehicle 286 may be replaced with a belt conveyor.

Figure 7:
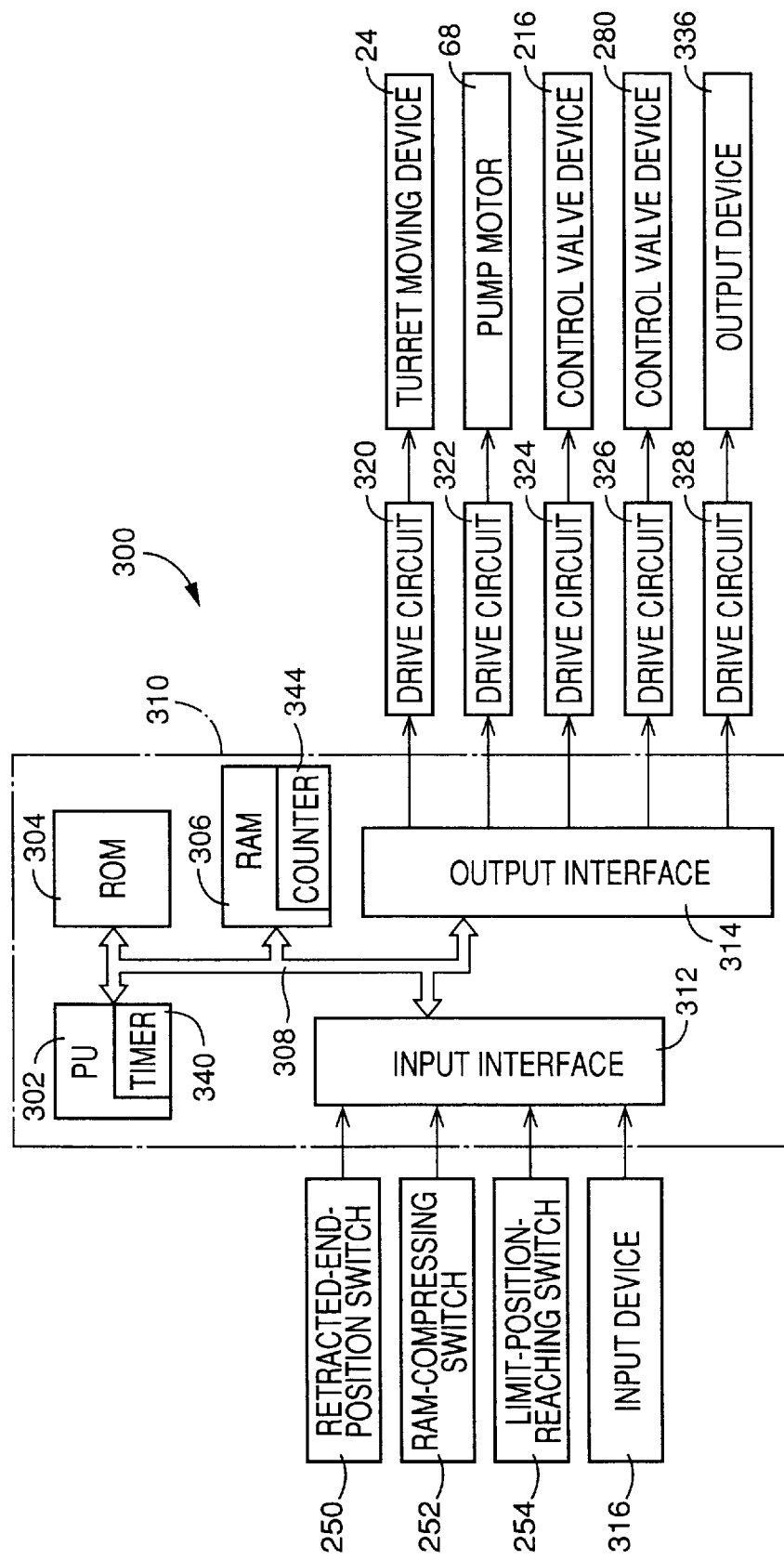
FIG. 7 is a diagrammatic view of a relevant portion of a controller of the lathe of FIG. 1.

The lathe 11 including the chip treating device 40 further includes a controller 300 shown in FIG. 7. The controller 300 is essentially provided by a computer 310 including a processing unit ("PU") 302, a read only memory ("ROM") 304, a random access memory ("RAM") 306, and a bus 308 for connecting the elements 302, 304, 306 to one another. An input interface 312 is connected to the bus 308, and the retracted-end-position switch 250, the ram-compressing switch 252, the limit-position-reaching switch 254, and an input device 316 such as a keyboard are connected to the input interface 312. The input device 316 is for inputting operator's commands and/or various sorts of data into the controller 300. An output interface 314 is connected to the bus 308, on one hand, is connected on the other hand to the turret moving device 24, the pump motor 68, the respective control valve devices 216, 280 for the two hydraulic cylinder devices 206, 274, and an output device 336 via respective drive circuits 320, 322, 324, 326, 328. In addition, the output interface 314 is connected to the main-shaft rotating device (not shown) which rotates the main shaft 12, the chuck rotating device (not shown) which rotates the chuck 16, the clamping device (not shown) which clamps the cutting-tool support 26, and the cutting-tool-support rotating device (not shown) which rotates the cutting-tool support 26. The output device 336 includes a display device which displays a message indicating that a chip compressing operation is abnormal, and/or an alarm device which generates an alarm sound indicating the same meaning. The display device additionally displays the current operating state of the controller 300, and/or the results of operation of the controller 300.

The PU 302 includes a timer 340, and the RAM 306 includes a counter 344. The ROM 304 stores various programs including a chip compressing routine represented by the flow chart of FIG. 8, and a workpiece machining routine (not shown) according to which the lathe 11 machines each workpiece 14.

In the lathe 11 including the chip treating device 40 and having the above-described construction, the chip produced when the workpiece 14 is machined, i.e., cut by each cutting tool 30 is sucked with air from the space between the cutting surface of the tip 34 of the cutting tool 30 and the cover member, and is sent to the main member 150 of the separating device 44 via the main suction passage. In addition, the chip falling from the cover member is received by the chip receptacle 100 and, while the open-and-close valve device 110 is opened, the received chip is sent to the separating device 44 via the secondary suction passage. The chip separated from the air by the separating device 44 is conducted through the introduction passage 158 and is accumulated in the housing 186 of the chip compressing device 48. When the chip compressing device 48 is not operated, the compressing ram 204 is positioned at the retracted-end position, as shown in FIGS. 9A and 10A, so as to open the introduction inlet 232, and the movable member 272 is positioned at the closing position so as to close the chip-discharge outlet 238 and thereby provide the chip storing space 282. Thus, the chip is gradually accumulated in the housing 186, i.e., in the chip storing space 282, from the bottom of the space 282.

Figure 8:
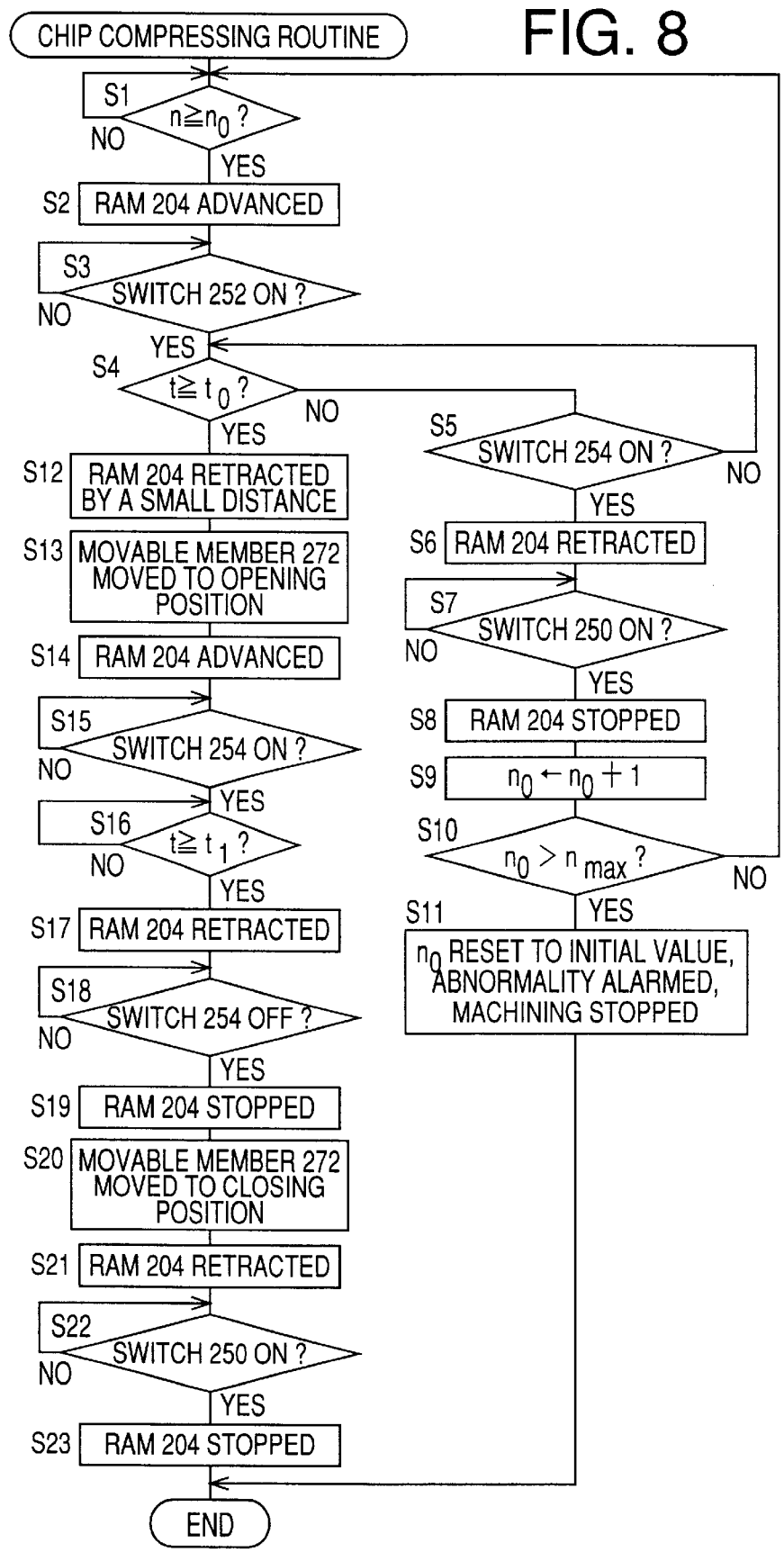
FIG. 8 is a flow chart representing a chip compressing routine pre-stored in a read only memory ("ROM") of a computer of the controller of FIG. 7.

The chip stored in the housing 186 is treated according to the chip compressing routine of FIG. 8. According to this routine, the chip compressing device 48 compresses the chip each time the number of workpieces 14 machined by the lathe 11 becomes equal to a predetermined number, $n_0$. Otherwise, it is possible that the chip compressing device 48 compress the chip each time the machining of one workpiece 14 is finished by the lathe 11. In the latter case, however, an amount of chip enough to be compressed has not been accumulated since the number of workpiece(s) machined is small, and accordingly it is useless to compress the chip. Since the controller 300 can know, from the workpiece machining control program pre-stored in the ROM 304, the sort of each workpiece 14 to be machined, and the sort of the machining method applied to the each workpiece 14, the controller 300 can estimate the amount of chip accumulated in the housing 186, based on the number of workpieces 14 that have already been machined. In the present embodiment, it is assumed that the amount of chip enough to be compressed is accumulated in the housing 186, at the time when ten workpieces 14 have been machined. Therefore, the number $n_0$ is predetermined to be eight ($n_0=8$), by taking into consideration that the amount of chip accumulated in the housing 186 naturally varies or fluctuates and accordingly the enough amount of chip may be reached before the machining of ten workpieces 14. The number of workpieces 14 machined is counted by the counter 344 according to the workpiece machining routine. The number $n_0$ is input through the input device 316 by an operator before the starting of the chip compressing operation according to the chip compressing routine.

First, at Step S1, the computer of the controller 300 judges whether the lathe 11 has machined the predetermined number $n_0$ of workpieces 14. The machining of each workpiece 14 is performed according to the workpiece machining routine, and the number of workpieces 14 machined is counted by the counter 344 according to the workpiece machining routine. At Step S1, the computer reads in the current number, n, counted by the counter 344, and judges whether the read-in number n is equal to, or greater than, the predetermined number $n_0$ (=8). At an early stage, a negative judgement is made at Step S1. Thus, Step S1 is repeated. When the counter 344 counts eight, a positive judgment is made at Step S1, and the control of the computer goes to Step S2 to start advancing the compressing ram 204.

Step S2 is followed by Step S3 to judge whether the ram-compressing switch 252 is producing the ON signal, that is, whether the ram 204 has been advanced to the introduction-inlet closing position. At an early stage, a negative judgement is made at Step S3. Thus, Step S3 is repeated. When the ram 204 reaches the introduction-inlet closing position, as shown in FIGS. 9B and 10B, a positive judgment is made at Step S3, and the control of the computer goes to Step S4 to judge whether the chip has been compressed.

More specifically described, at Step S4, the computer judges whether a predetermined time, $t_0$, has passed after the output signal of the ram-compressing switch 252 turns from the OFF signal to the ON signal and before the output signal of the limit-position-reaching switch 254 turns from the OFF signal to the ON signal. If an amount of chip enough to be compressed has been accumulated in the housing 186, the compressing ram 204 cannot reach the predetermined limit position, because the reaching of the ram 204 is obstructed by the chip accumulated. On the other hand, if no amount of chip has been accumulated in the housing 186, or only a small amount of chip has been accumulated, the ram 204 can soon reach the predetermined limit position, as shown in FIG. 9C.

The time $t_0$ is predetermined to be longer than a time which is needed for the compressing ram 204 to compress, after passing through the introduction-inlet closing position, a sufficient amount of chip accumulated in the housing 186, and subsequently finalize the compression of the chip. After the ram 204 contacts the chip accumulated, the ram 204 is advanced, to compress the chip, to a position where the pressure of the hydraulic cylinder device 206 reaches a predetermined value (defined by the valve opening pressure of the proportional relief valve 224), i.e., the compressing force of the ram 204 reaches a predetermined value. However, the chip cannot be completely compressed unless the ram 204 is kept at the advanced position to continue applying the force to the chip for a predetermined time.

Figure 11A:
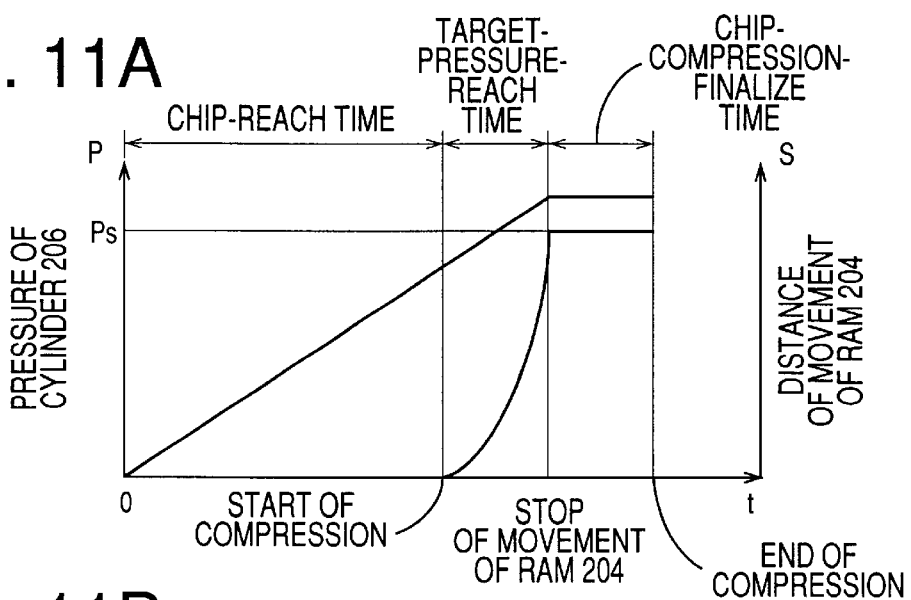
FIGS. 11A, 11B, and 11C are graphs showing respective relationships between time and each of the pressure of the hydraulic cylinder device and the distance of movement of the compressing ram, obtained when the chip compressing device compresses different amounts of chip, respectively.
Figure 11B:
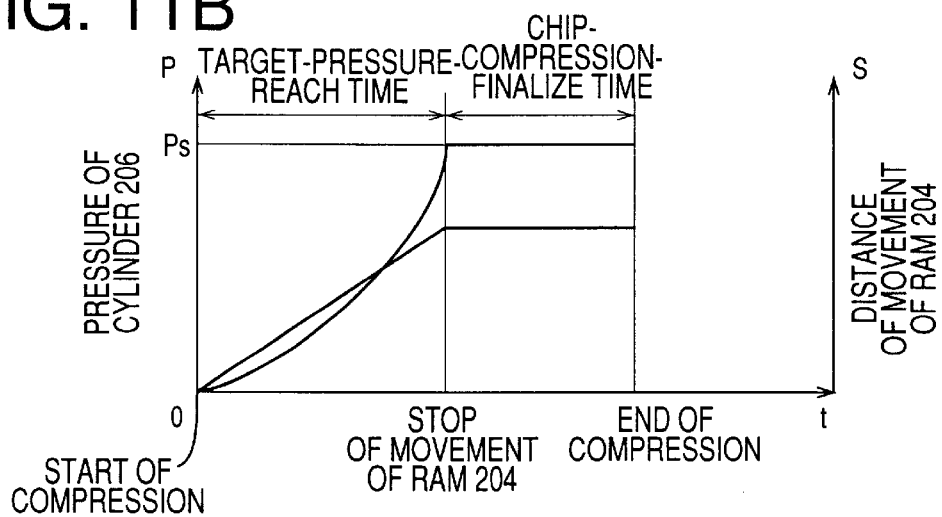
Figure 11C:
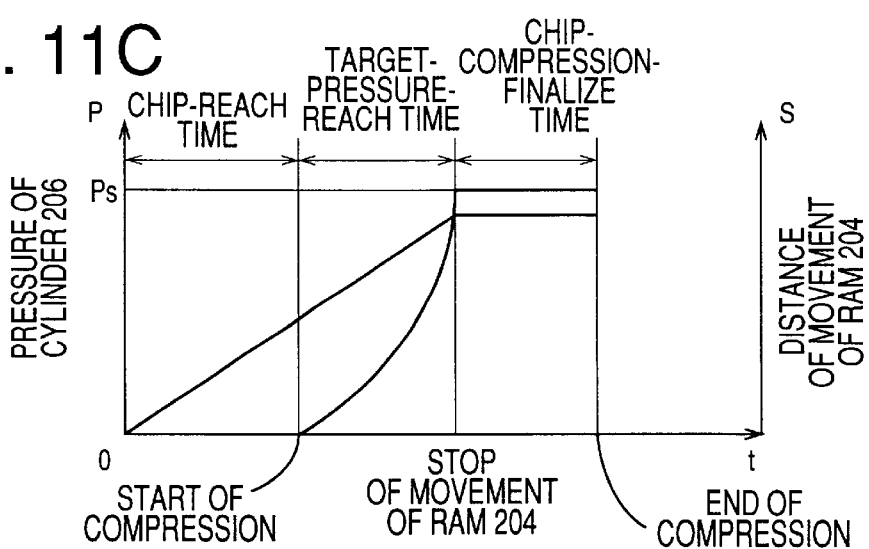

FIGS. 11A, 11B, and 11C shows respective graphs showing respective relationships between time and each of the pressure of the hydraulic cylinder device 206 and the distance of movement of the compressing ram 204, after the ram 204 reaches the introduction-inlet closing position. The three graphs are obtained when the chip compressing device 48 compresses different amounts of chip, respectively; FIG. 11A shows the graph obtained when the device 48 compresses a small amount of chip; FIG. 11B shows the graph obtained when the device 48 compresses a large amount of chip; and FIG. 11C shows the graph obtained when the device 48 compresses a medium amount of chip. FIGS. 11A to 11C show that irrespective of the amount of chip accumulated in the housing 186, the compressing ram 204 is advanced at a constant speed defined by the amount of outputting of the pump 218, till the pressure of the hydraulic cylinder device 206 reaches a predetermined pressure value, $P_s$, (which is used irrespective of the amount of chip accumulated); that a time needed for the ram 204 to contact the chip and start compressing the chip (hereinafter, referred to as the "chip reaching time"), a time needed, after the ram 204 starts compressing the chip, for the pressure of the hydraulic cylinder device 206 to reach the predetermined pressure $P_s$, so that the ram 204 stops advancing (hereinafter, referred to as the "pressure-reach time"), and a time for the ram 204 to finalize the compression of the chip (hereinafter, referred to as the "compression-finalize time") may change depending upon the amount of chip accumulated; and that a time from the time when the ram 204 reaches the introduction-inlet closing position and to the time when the ram 204 completes the compression of the chip may change depending upon the amount of chip accumulated. In view of those facts, the time to is predetermined to be somewhat longer than a time for which the ram 204 can complete the compression of the chip, after the ram 204 reaches the introduction-inlet closing position, irrespective of what amount of chip may have been accumulated in the housing 186 and whatever nature the chip may have.

At Step S4, the computer judges whether the predetermined time $t_0$ has passed, by judging whether a time, t, measured by the timer 340 is equal to, or greater than, the predetermined time $t_0$. At an early stage, a negative judgment is made at Step S4, and the control of the computer goes to Step S5 to judge whether the limit-position-reaching switch 254 is producing the ON signal. At an early stage, a negative judgment is made at Step S5, and the control of the computer goes back to Step S4. In the case where no chip, or only a small amount of chip, if any, is present in the housing 186, a positive judgment is never made at Step S4, and a positive judgment is made at Step S5, so that the control of the computer goes to Step S6 to retract the compressing ram 204 back to the retracted-end position and reset the time t measured by the timer 340 to zero. When the ram 204 is moved to the retracted-end position and the retracted-end-position switch 250 produces the ON signal, a positive judgment is made at Step S7, and the control of the computer goes to Step S8 to stop the retraction of the ram 204. Thus, the ram 204 is effectively prevented from "compressing the air", i.e., directly pressing the movable member 272, or indirectly pressing the same 272 via the small amount of chip.

The chip compressing device 48 starts compressing the chip, when the number of workpieces 14 machined becomes equal to eight. If the same number of workpiece machining operations have been performed in a normal manner and the chip has been accumulated in the housing 186 in a normal manner, an amount of chip comparable with the amount of chip enough to be compressed should have been accumulated in the housing 186, and the problem of "compressing the air" should not occur, at the point of time when the machining of eight workpieces 14 ends. Therefore, if the output signal of the limit-position-reading switch 254 turns, even one time, from the OFF signal to the ON signal, before the predetermined time $t_0$ has passed, then the computer may judge that an abnormality has occurred to the chip compressing operation. In the present embodiment, however, the chip compressing device 48 tries to compress the chip each time the lathe 11 has machined each one of a predetermined number of additional workpieces 14 after the output signal of the switch 254 turns from the OFF signal to the ON signal and, if the output signal of the switch 254 still turns from the OFF signal to the ON signal, then the computer first judges that an abnormality has occurred to the chip compressing operation.

The output signal of the limit-position-reaching switch 254 turns from the OFF signal to the ON signal, for example, when the machining of workpieces 14 progresses in a normal manner but a certain abnormality occurs to the conveying (i.e., suction) of chip, for example, the suction passage between the tip 34 and the chip compressing device 48 is packed by the chip and accordingly an enough amount of chip cannot be accumulated in the housing 186. Otherwise, the output signal turns to the ON signal when a malfunction occurs to the lathe 11 and accordingly an enough amount of chip cannot be accumulated, for example, when the number of the workpieces 14 machined is miscounted according to the workpiece machining routine and the miscounted number coincides with the predetermined number $n_0$ though the number of the workpieces 14 actually machined does not coincide with the number $n_0$, or when the workpiece machining operation is performed in the state in which the chuck 16 is holding no workpiece 14, or in the state in which the cutting-tool support 26 is supporting no cutting tools 30. In the latter case, so long as the malfunction is not corrected, there is no possibility that the predetermined time $t_0$ may have passed before the output signal of the limit-position-reaching switch 254 turns from the OFF signal to the ON signal, even though the number of the workpieces 14 machined may increase. On the other hand, in the former case, the packing of the suction passage may naturally disappear and the chip may be accumulated in the housing 186, and accordingly there is some possibility that the predetermined time $t_0$ may have passed before the output signal of the switch 254 turns from the OFF signal to the ON signal. Therefore, in the present embodiment, the computer does not judge that an abnormality has occurred, even if the output signal of the switch 254 may turn from the OFF signal to the ON signal, just one time. Rather, each time the machining of each one of a predetermined number of additional workpieces 14 ends, the compressing ram 204 is advanced and it is judged whether an enough amount of chip has been accumulated.

The limit position of advancing of the compressing ram 204 is predetermined such that the limit position is a small distance back in the direction of retracting of the ram 204 from a position where the ram 204 directly presses the movable member 272 or indirectly presses the movable member 272 via a small amount of chip. Therefore, the predetermined time $t_0$ may pass before the output signal of the switch 254 turns from the OFF signal to the ON signal, even if only a small amount of chip may have been accumulated in the housing 186. Thus, the size of the compressed chip may vary or fluctuate.

When the output signal of the limit-position-reaching switch 254 turns to the ON signal, the compressing ram 204 is retracted to, and stopped at, the retracted-end position. Then, the control of the computer goes to Step S9 to add one to the number being counted by the counter 344, and add one to the predetermined number $n_0$ so that the number $n_0$ is increased to nine. Step S9 is followed by Step S10 to judge whether the predetermined number $n_0$ has increased up to a predetermined maximum number, $n_{max}$ (in the present embodiment, the number $n_{max}$ is 12). The number $n_{max}$ and the initial number $n_0$ (=8) are input in the controller 300 by the operator through the input device 316. At an early stage, a negative judgment is made at Step S10, and the control goes back to Step S1.

In the present embodiment, the compressing ram 204 tries to compress the chip, each time the machining of one workpiece 14 ends, after the number of workpieces 14 machined has reached the initial predetermined number $n_0$ and before the chip is actually compressed and discharged. Here it is assumed that after the machining of one workpiece 14 ends, the machining of the next workpiece 14 is not started and accordingly no chip is sent to the housing 186, during a time after the compressing ram 204 is lowered to the predetermined limit position and before the ram 204 is returned to the retracted-end position, or during a time after the ram 204 is lowered to the advanced-end position and before the ram 204 is returned to the retracted-end position. Therefore, in the case where Step S1 is executed after a negative judgment is made at Step S10, negative judgments are made at Step S1 till the machining of the next (i.e., ninth) workpiece 14 ends. When the machining of the next workpiece 14 ends, a positive judgment is made at Step S1, and the computer executes Steps S2 to S5. In this new control cycle, too, Steps S6 to S10 are executed when the output signal of the switch 254 turns from the OFF signal to the ON signal.

When the output signal of the limit-position-reaching switch 254 turns from the OFF signal to the ON signal even after the twelve workpieces 14 have been machined, a positive judgment is made at Step S10, and the control goes to Step S11 where the computer operates the output device 336 to inform the operator of the occurrence of abnormality to the chip compressing operation. In addition, the computer stops the machining of the current workpiece 14, and resets the current value of the number $n_0$ to its initial value (eight). Thus, unless an amount of chip enough to be compressed has been accumulated, the compressing ram 204 is not advanced over the predetermined limit position. Therefore, the ram 204 is prevented, when no amount of chip or only a small amount of chip has been accumulated in the housing 186, from directly pressing the movable member 272 or indirectly pressing the same 272 via the small amount of chip or a foreign matter such as a shot ball or a broken piece of the tip 34, and the ram 204 and the movable member 272 are prevented from being scarred. In addition, even in the case where a foreign matter such as a shot ball or a broken piece of the tip 34 is mixed with a small amount of chip, the foreign matter is well buried in the chip when the chip is compressed by the ram 204 being advanced midway to the predetermined limit position. Thus, the ram 204 and the movable member 272 are prevented from pressing each other via the foreign matter. Moreover, since generally a foreign matter has a size smaller than the distance between the movable member 272 and the ram 204 being positioned at the limit position, the ram 204 and the movable member 272 are prevented from pressing each other via the foreign matter. The chip compressing device 48 does not perform a chip discharging operation when there is no compressed chip block in the housing 186. No too small compressed chip blocks are discharged.

Figure 10E:
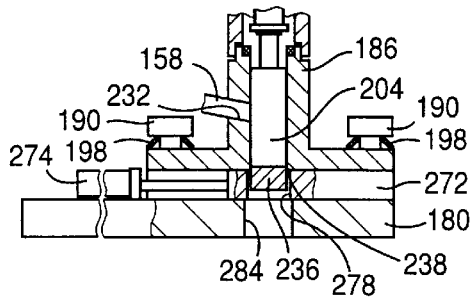
Figure 10B:
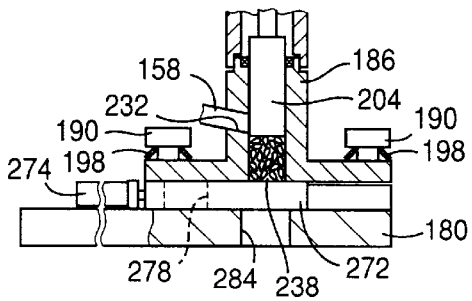
Figure 10F:
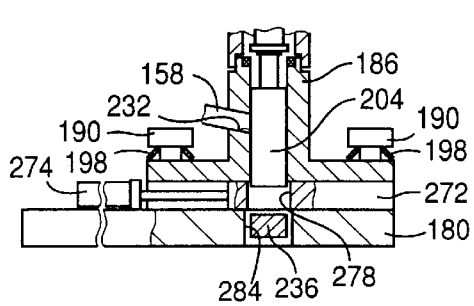
Figure 10C:
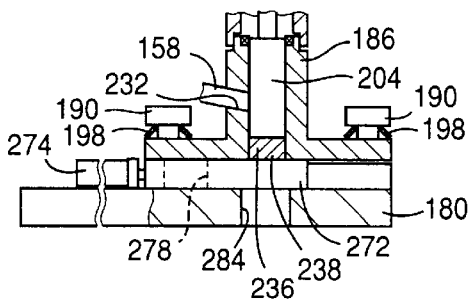

When an enough amount of chip to be compressed has been accumulated in the housing 186, the entire amount of chip is compressed by the compressing ram 204, the movable member 272, and the housing 186, as shown in FIGS. 10B and 10C. During this step, the housing 186 is pressed against the movable member 272 because of the friction force produced between the chip and the housing 186 and the biasing force of the disc springs 198. Accordingly, the housing 186 is prevented from being separated from the movable member 272 by the pressure produced in the chip. Thus, the chip is effectively prevented from entering a small space which would otherwise be produced between the end surface of the housing 186, and the movable member 272. Although, as described previously, the biasing force of the disc springs 198 is pre-set at a small force which is narrowly greater than the friction force produced between the ram 204 and the housing 186 when the ram 204 is retracted, the housing 186 is not separated from the movable member 272 when the chip is compressed. Thus, the predetermined time to passes before the output signal of the limit-position-reaching switch 254 turns from the OFF signal to the ON signal, and a positive judgment is made at Step S4. The time $t_0$ is predetermined to be somewhat longer than a time needed to complete the chip compressing operation (including the previously-described finalizing step) irrespective of what amount of chip may have been accumulated or what nature the chip may have. Therefore, a positive judgment made at Step S4 means that the chip compressing operation has been completed. Steps S2 to S4 provide the chip compressing steps, and Steps S5 to S11 provide the "compressing-the-air" preventing steps.

Figure 10G:
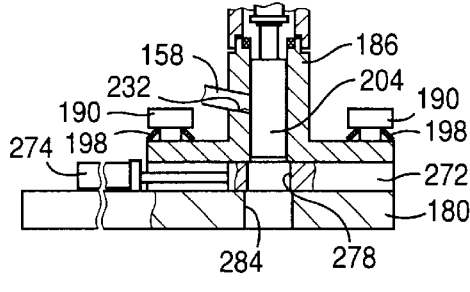
Figure 10D:
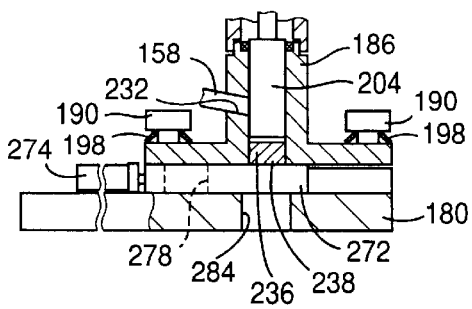

If a positive judgment is made at Step S4, the control goes to Step S12 to retract the compressing ram 204 over a small distance and thereby separate the ram 204 from the chip block 236, as shown in FIG. 10D. More specifically described, the solenoid-operated direction-switch valve 222 is switched for a predetermined time to the state in which the valve 222 permits the ram 204 to be retracted. After the retraction of the ram 204, the two solenoids of the valve 222 are deenergized so that the ram 204 is kept stopped. Thus, no compressing force is applied to the chip block 236.

The compressing ram 204 is retracted by a distance which ensures that even if a spring back may occur to the chip block 236 now receiving no compressing force, the ram 204 is kept at a position which is away from the chip block 236 and where the ram 204 keeps closing the introduction inlet 232. When a spring back occurs to the chip block 236 as the ram 204 is retracted, the housing 186 is retracted against the biasing force of the disc springs 198. This retraction of the housing 186 is stopped when the spring-back force of the chip block 236 is counterbalanced by the biasing force of the disc springs 198. Thus, the force of the block 236 to press the movable member 272 decreases down to be equal to the biasing force of the springs 198. As described previously, the biasing force of the disc springs 198 is just required to be greater than the friction force produced between the ram 204 and the housing 186 when the ram 204 is retracted, and accordingly is predetermined at a small value. Thus, the force of the chip block 236 to press the movable member 272 can be decreased.

Next, the control of the computer goes to Step S13 to move the movable member 272 to the opening position. Since the friction produced between the movable member 272 and both of the chip block 236 and the main frame 180 when the movable member 272 is moved to the opening position is small, the small-size hydraulic cylinder device 274 can move the movable member 272. Since the introduction passage 158 is provided by a flexible hose, the passage 158 can follow the housing 186 when the housing 186 is moved toward, and away from, the movable member 272.

FIG. 10E shows the movable member 272 being positioned at the opening position where the through-hole 278 of the movable member 272 is aligned with the chip-discharge outlet 238 of the housing 186. Step S13 is followed by Step S14 to advance the compressing ram 204. Then, at Step S15, the computer judges whether the output signal of the limit-position-reaching switch 254 turns from the OFF signal to the ON signal, that is, whether the ram 204 has been advanced to the predetermined limit position. If the ram 204 reaches the limit position, a positive judgment is made at Step S15, and the control proceeds with Step S16 to judge whether a predetermined time, $t_1$, has passed after the ram 204 reaches the limit position. Thus, the ram 204 is further advanced for the additional time $t_1$.

A positive judgment made at Step S4 means that the chip compressing operation has been completed. Thus, subsequent steps, Steps S12 to S20, are carried out to discharge the chip block 236, and thus provide chip discharging steps. At Step S15 as one of the chip discharging steps, the limit-position-reaching switch 254 detects that the compressing ram 204 has been advanced over the limit position. In the chip discharging steps, the ram 204 is not retracted when the output signal of the switch 254 turns to the ON signal, unlike in the chip compressing steps.

Next, at Step S16, the computer judges whether the predetermined time $t_1$ has passed. The time $t_1$ is predetermined to be long enough for the compressing ram 204 to be further advanced, after the ram 204 reaches the limit position, to the advanced-end position where the lower end portion of the ram 204 projects a small distance from the housing 186 into the through-hole 278 of the movable member 272. At an early stage, a negative judgment is made at Step S16, and Step S16 is repeated till the time $t_1$ has passed. As the ram 204 is moved to the advanced-end position, the chip block 236 is pushed down from the housing 186 into the though-hole 278, and then is discharged into the chip conveying vehicle 286 via the chip-discharge passage 284. The ram-compressing switch 252 continues to output the ON signal, while the compressing ram 204 is advanced from the introduction-inlet closing position to the advanced-end position. From the ON signal supplied from the switch 252, the computer recognizes that the ram 204 is advancing. From the fact that the ram 204 is advancing in the chip discharging steps, the computer recognizes that the chip is being discharged.

Figure 10H:
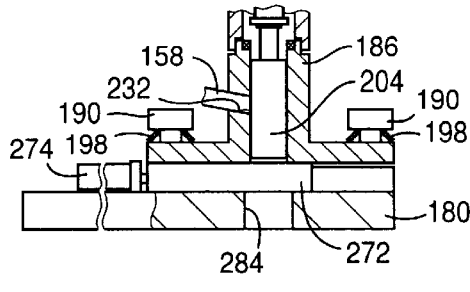

If the predetermined time $t_1$ has passed and a positive judgment is made at Step S16, the control goes to Step S17 to retract the compressing ram 204 back to a position over the predetermined limit position, as shown in FIG. 10G. Since the limit-position-reaching switch 254 outputs the ON signal only while the ram 204 is moved between the limit position and the advanced-end position, the computer recognizes that the ram 204 has been retracted over the limit position, when the output signal of the switch 254 turns from the ON signal to the OFF signal. When the ram 204 has been retracted over the limit position, a positive judgment is made at Step S18, and the control goes to Step S19 to stop the retraction of the ram 204. Step S19 is followed by Step S20 to move the movable member 272 to the closing position, as shown in FIG. 10H, so that the chip-discharge outlet 238 is closed by the movable member 272. Then, at Step S21, the ram 204 is further retracted to the retracted-end position, and the output signal of the retracted-end switch 250 turns from the OFF signal to the ON signal. Thus, the computer recognizes that the ram 204 has reached the retracted-end position, and a positive judgment is made at Step S22. Step S22 is followed by Step S23 to stop the retraction of the ram 204. After the compressing of the chip accumulated in the housing 186 is completed, the number of the workpieces 14 machined that is counted by the counter 344 according to the workpiece machining program, is reset to zero. Then, if the number counted by the counter 344 coincides with the predetermined number $n_0$, the chip compressing device 48 starts another chip compressing operation. The computer can judge whether the compressing of the chip has been completed, from one of the chip compressing steps that is being carried out.

Even though the compressing ram 204 is retracted to the position where the output signal of the limit-position-reaching switch 254 turns from the ON signal to the OFF signal, the ram 204 being at that position remains closing the introduction inlet 232. Therefore, when the movable member 272 is moved from the opening position to the closing position and the chip-discharge outlet 238 is closed, the inlet 232 remains closed. After the outlet 238 is closed by the movable member 272, the ram 204 is retracted to the retracted-end position and accordingly the inlet 232 is opened. In the state in which the ram 204 is positioned at the retracted-end position and the inlet 232 is opened, the movable member 272 is positioned at the closing position and the outlet 238 is closed; and in the state in which the movable member 272 is positioned at the opening position and the outlet 238 is opened, the ram 204 is retracted away from the advanced-end position but the inlet 232 is closed by the ram 234. Thus, the outlet 238 and the inlet 232 are not simultaneously opened. Since the ram 204 is fitted in the housing 186 via the dust-seal member 213, ambient air is prevented from entering the housing 186 via the interface between the ram 204 and the housing 186. Accordingly, the separating device 44 which is communicated with the chip compressing device 48 via the introduction passage 158 is completely isolated from the atmosphere, and the air is prevented from being sucked via the device 48 and the passage 158. Thus, the air is flown at a high rate in the vicinity of the cutting surface of the tip 34, and accordingly the chip sucking function of the suction device 42 is kept intact. In addition, the air/chip separating function of the separating device 44 is kept intact, and accordingly the filter device 46 is not packed by the chip.

In the present embodiment, the compressing of the chip is started after the machining of a predetermined number of workpieces 14 is ended. Thus, the respective sizes of the compressed chip blocks 236 are averaged to some extent. However, if the amount of chip accumulated in the housing 186 varies, the size of the compressed chip block 236 varies. In a particular case where the limit position is predetermined to be around the chip-discharge outlet 238, even small amounts of chip may be compressed. In this case, the respective sizes of the compressed chip blocks 236 may differ from each other. In contrast, in the case where the limit position is predetermined to be far away from the outlet 238, only great amounts of chip are compressed. In the latter case, the compressed chip blocks 236 have a generally uniform size, though the amounts of chip accumulated in the housing 186 may more or less vary.

In the present embodiment, the predetermined number $n_0$ used in judging whether to start the chip compressing operation is smaller than a number corresponding to an amount of chip enough to prevent the compressing ram 204 from reaching the predetermined limit position, and the predetermined maximum number $n_{max}$ is greater than a number corresponding to a predetermined amount of chip. Therefore, at an early stage, a positive judgment is made at Step S5, and no compression occurs. Meanwhile, as Steps S1 to S11 are repeated, the number of the workpieces 14 machined increases and the amount of chip accumulated in the housing 186 increases. Eventually, the predetermined time $t_0$ passes before the output signal of the limit-positionreaching switch 254 turns from the OFF position to the ON position. That is, the computer waits for the accumulation of an amount of chip enough to be compressed, while repeating Steps S9 and S10. Thus, the compressed chip blocks 236 have a generally uniform size. Since the compressing ram 204 compresses respective amounts of chip which can provide compressed chip blocks 236 having a generally uniform size, the ram 204 is effectively prevented from "compressing the air". Thus, compressing the predetermined amount of chip means preventing the ram 204 from "compressing the air".

It emerges from the foregoing description that in the present embodiment, the three bolts 190 provide a housing attaching device which attaches the housing 186 to the main frame 180 such that the housing 186 is separable from the movable member 272; the three disc springs 198 provide a biasing device, which cooperates with the main frame 180 to provide a supporting device. The bolts 190 also provide guide rods which support the housing 186 such that the housing 186 is movable in the axial direction thereof. The first hydraulic cylinder device 206 provides a ram moving device; and the second hydraulic cylinder device 274 provides a movable-member moving device. A portion of the controller 300 that carries out Steps S3 and S4 cooperates with the ram-compressing switch 252 to provide a ram-compressing detecting device; the dog 244, the limit-position-reaching switch 254, and a portion of the controller 300 that carries out Step S5 cooperate with one another to provide a limit-position-reaching detecting device, which cooperates with the ram-compressing detecting device to provide an excessive-advancement detecting device; and a portion of the controller 300 that carries out Steps S6 to S8 provides a "compressing-the-air" preventing means as a sort of ram-compressing stopping means. A portion of the controller 300 that carries out Steps S14 to S16 provides a chip-discharging control portion. A portion of the controller 300 that carries out Steps S17 to S23 provides a means for preventing the cyclone separator 44 from being communicated with the atmosphere, by controlling the two hydraulic cylinder devices 206, 274 such that the introduction inlet 232 and the chip-discharge outlet 238 are not simultaneously opened by the compressing ram 204 and the movable member 272, respectively.

The time $t_0$ may be changed depending upon the nature of the chip to be accumulated in the housing 186.

It is possible that the relative position of the dog 248 and the limit-position-reaching switch 254 in a direction parallel to the direction of movement of the compressing ram 204 be adjustable. In this case, the respective sizes of the compressed chip blocks 236 can be averaged to a generally uniform one, by changing the limit position of the ram 204. More specifically described, the limit position is predetermined at a position which is distant by a small distance in the direction of advancement of the ram 204 from the position of the upper end of a maximum amount of chip which is permitted to be accumulated in the housing 186. In this case, the ram 204 is prevented from compressing small amounts of chip accumulated in the housing 186. In the case where the switch 254 is required to keep producing the ON signal throughout a time duration after the ram 204 reaches the limit position and before the ram 204 reaches the advanced-end position, the length of the dog 248 may be changed to meet this requirement. The time $t_1$ used in discharging the chip block 236 from the housing 186 is predetermined to be long enough for the ram 204 to move from the limit position to the advanced-end position, depending upon what position the limit position takes. Likewise, it is also possible that the relative position of the dog 244 and the retracted-end-position switch 250 be adjustable, and that the relative position of the dog 246 and the ram-compressing switch 252 be adjustable. The time $t_0$ is predetermined to be somewhat longer than a time needed to complete the compression of the chip, depending upon the amount of chip. The time $t_0$ may be predetermined while additionally taking the nature of the chip into account, that is, additionally depending upon the nature of the chip, or alternatively it may be predetermined to be somewhat longer than a time needed to complete the compression of the chip, irrespective of what nature the chip may have.

In the case where the chip compressing device 48 compresses only the chip that has a prescribed nature, the device 48 can prevent the problem of "compressing the air", by employing a time $t_0$ which is predetermined depending upon the prescribed nature of the chip, and can compress respective amounts of chip into compressed chip blocks 236 having a uniform size, by employing a time $t_0$ which is predetermined depending upon the nature and amount of the chip.

Otherwise, the time $t_0$ may be predetermined to be somewhat longer than a time needed to complete the compression of the chip, irrespective of whether the chip compressing device 48 may compress only a single sort of chip having a prescribed nature, or a plurality of sorts of chip, irrespective of whether the device 48 may have the function of preventing the problem of "compressing the air", and/or irrespective of whether the device 48 may have the function of compressing respective amounts of chip into compressed chip blocks 236 having a uniform size.

The time $t_0$ and/or the time $t_1$ may be pre-stored in the computer, may be input in advance by the operator through the input device 316, or may be automatically determined by the computer based on the nature and/or amount of the chip.

In the above-described embodiment, the computer utilizes the ON or OFF signal of the limit-position-reaching switch 254, for judging whether the compressing ram 204 has reached the predetermined limit position in the state in which it is being detected that the ram 204 is operated in the chip compressing steps. However, the computer may be modified to utilize a load exerted to the hydraulic cylinder device 206 as the ram moving device.

Figure 12:
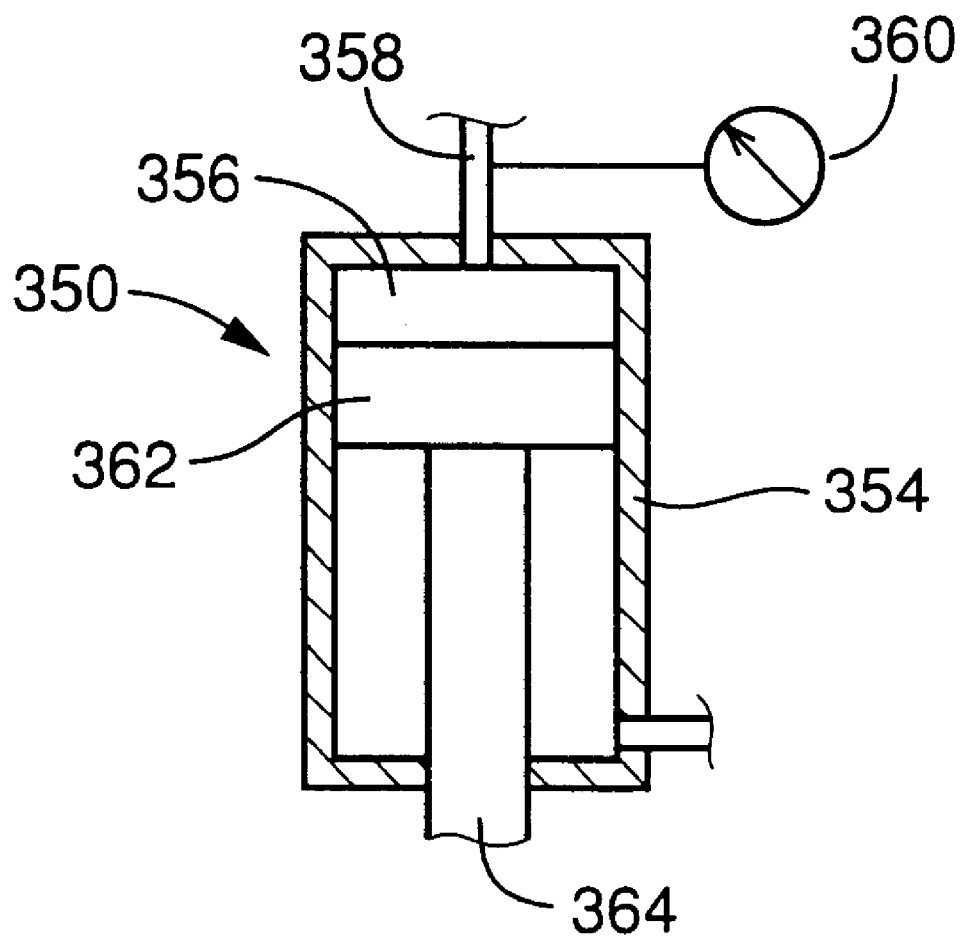
FIG. 12 is a view of a hydraulic cylinder device as a ram moving device of another chip compressing device as a second embodiment of the present invention.
Figure 13:
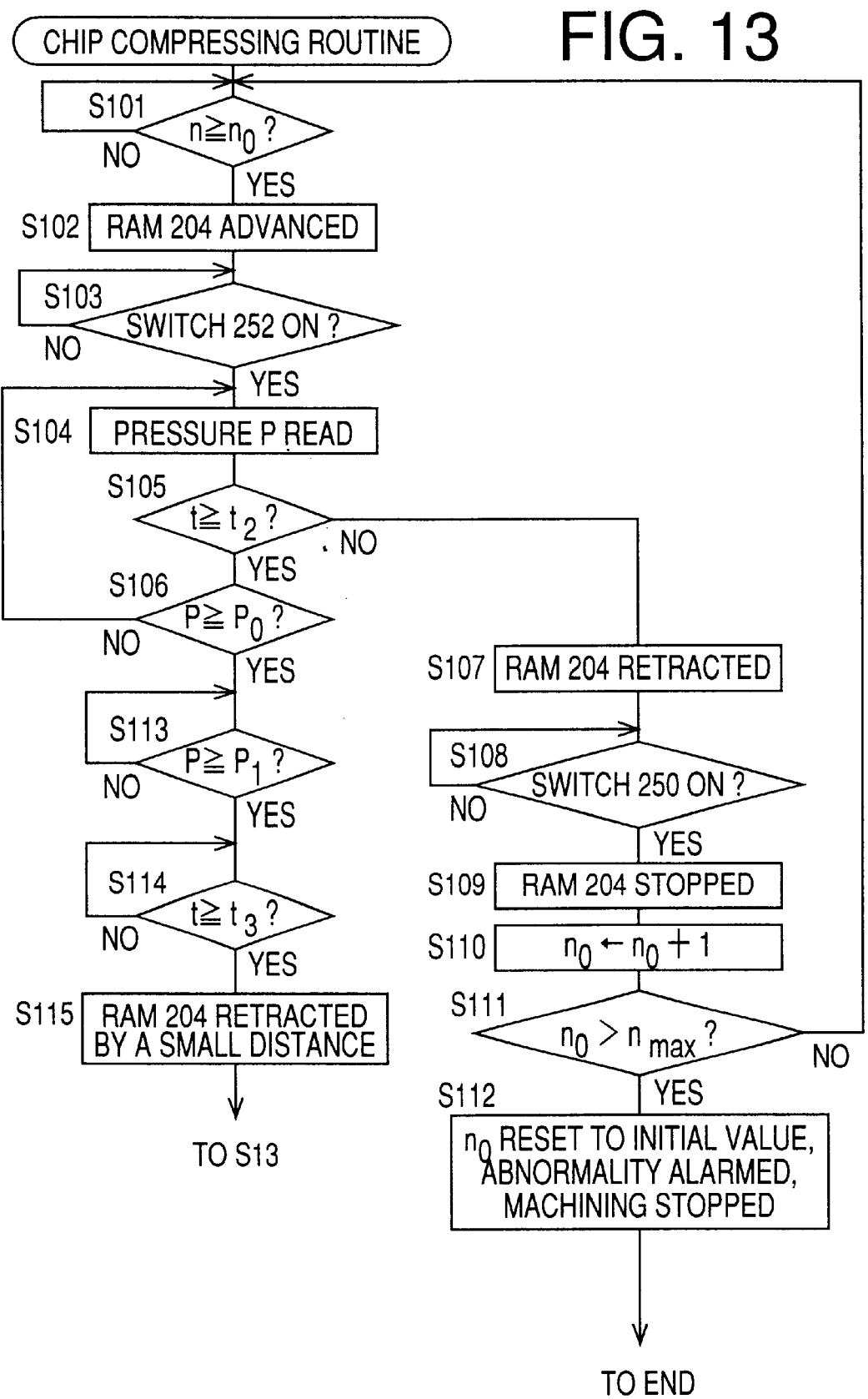
FIG. 13 is a flow chart representing a chip compressing routine pre-stored in a ROM of a computer of a controller used with the chip compressing device of FIG. 12.

FIG. 12 shows a second embodiment of the present invention that is directed to a chip compressing device 350 including a hydraulic cylinder device 354 as a ram moving device. The cylinder device 354 includes a pressure gauge 360 which is provided in a passage 358 through which a hydraulic pressure is supplied to a piston-side chamber 356. The hydraulic pressure of the cylinder device 354 is proportional to a load externally exerted to the same 354. Therefore, the load can be known by measuring the hydraulic pressure. Thus, the pressure gauge 360 can be regarded as a load detecting or measuring device. The chip compressing device 350 is controlled by a controller (not shown) which is similar to the controller 300 shown in FIG. 7 and which includes a ROM in which a chip compressing routine represented by the flow chart of FIG. 13 is stored. According to this chip compressing routine, the discharging of each compressed chip block 236 is performed in the same manner as that employed in the first embodiment shown in FIGS. 1 to 11. Hence, the illustration of discharging of the chip block 236 is omitted. Reference numeral 362 designates a piston of the cylinder device 354, and reference numeral 364 designates a piston rod of the same 354. The other elements of the chip compressing device 350 are the same as those of the chip compressing device 48, and the description and illustration thereof are omitted. The same reference numerals as used for the latter device 48 will be used to refer to the corresponding elements of the former device 350, even though those elements may not be shown in FIG. 12.

According to the chip compressing routine in the second embodiment, a computer of the controller judges, if the pressure of the hydraulic cylinder 354 increases up to a predetermined pressure value, $P_0$, within a predetermined time, $t_2$, after a compressing ram 204 has reached a introduction-inlet closing position thereof, that an amount of chip enough to be compressed has been accumulated in a housing 186. On the other hand, if the predetermined time $t_2$ has passed before the hydraulic pressure reaches the pressure value $P_0$, the computer judges that an amount of chip accumulated in the housing 186 is not enough to be compressed. This is because, if an enough amount of chip has been accumulated in the housing 186, the pressure of the hydraulic cylinder 354 increases from zero.

The time $t_2$ is predetermined to be shorter than a long time needed for the compressing ram 204 to advance and "compress the air" and is longer than a short time needed for the ram 204 to advance and contact too much amount of chip accumulated in the housing 186. The pressure value $P_0$ is predetermined to be smaller than the greatest one of the pressure values needed to compress the chip and is greater than the smallest pressure value that can be said as a substantial pressure usable to compress the chip. By employing appropriate values for the time $t_2$ and the pressure $P_0$, the chip compressing device 350 can prevent the problem of "compressing the air", or can not only prevent the problem of "compressing the air" but also discharge compressed chip blocks 236 having a generally uniform size. As described above, the pressure of the hydraulic cylinder 354 is proportional to the load exerted to the same 254. Therefore, the predetermined pressure $P_0$ can be regarded as a predetermined load.

First, there will be described the case where the time $t_2$ is predetermined, for preventing "compressing the air", to be somewhat shorter than such a long time that if the compressing ram 204 continues advancing for more than the long time, the ram 204 would "compress the air". In this case, the pressure value $P_0$ is predetermined to be somewhat greater than such a small pressure that can be said as a substantial pressure usable to compress the chip. In addition, the number $n_0$ of the workpieces 14 machined that is used in starting the chip compressing operation is predetermined to be smaller than the number (e.g., ten) of workpieces 14 corresponding to an amount of chip enough to be compressed. Here it is assumed that the predetermined number $n_0$ is eight and the maximum number $n_{max}$ is twelve. The predetermined time $t_2$ and the predetermined pressure $P_0$ are input by an operator through an input device 316 together with the predetermined number $n_0$ and the predetermined maximum number $n_{max}$. In the present embodiment, since the nature of the chip is constant, the time $t_2$ and the pressure $P_0$ are determined and input by the operator depending upon the nature of the chip.

In the chip compressing routine of FIG. 13, Steps S101, S102, and S103 are the same as Steps S1, S2, and S3 of FIG. 8, respectively. If the compressing ram 204 passes through the introduction-inlet closing position and accordingly a positive judgment is made at Step S103, the control of the computer goes to Step S104 to read a pressure value, P, detected by the pressure gauge 360. Step S104 is followed by Step S105 to judge whether the predetermined time $t_2$ has passed. At an early stage, a negative judgment is made at Step S105, and the control goes to Step S106 to judge whether the pressure value P read at Step S104, i.e., the pressure of the hydraulic cylinder 354 is equal to, or greater than, the predetermined pressure value $P_0$. At an early stage, a negative judgment is made at Step S106, and the control goes back to Step S104.

If an amount of chip enough to be compressed has not been accumulated in the housing 186, the predetermined time $t_2$ passes before the pressure of the hydraulic cylinder 354 increases up to the predetermined pressure $P_0$. In this case, the computer carries out Steps S107, S108, S109, S110, and S111 which are the same as Steps S6, S7, S8, S9, and S10 of FIG. 8, respectively. Thus, the compressing ram 204 is retracted, and thus is prevented from being advanced to directly press a movable member 272 or indirectly press the same 272 via only a small amount of chip accumulated in the housing 186. The computer does not judge that an abnormality has occurred to the chip compressing operation, when just one time the predetermined time $t_2$ has passed before the pressure of the hydraulic cylinder 354 increases up to the predetermined pressure $P_0$. Rather, the computer carries out Steps S110 and S111 where the compressing ram 204 tries to compress the chip each time the machining of each one of a predetermined number of additional workpieces 14 ends. However, if the time $t_2$ still passes before the hydraulic pressure increases up to the pressure $P_0$, with respect to the last one of the predetermined number of additional workpieces 14, the computer carries out Step S112 to inform the operator of the occurrence of an abnormality to the chip compressing operation. Since the time $t_2$ is long, the compressing ram 204 may compress even a small amount of chip accumulated in the housing 186, because the hydraulic pressure may increase up to the pressure $P_0$ within the long time $t_2$. However, the respective sizes of the thus compressed chip blocks 236 may differ from each other. That is, Steps S110 and S111 are provided not for providing compressed chip blocks 236 having a generally uniform size but for waiting for the accumulation of an amount of chip enough to be compressed. Steps S107 to S112 provide the "compressing-the-air" preventing steps.

In the case where an amount of chip enough to be compressed has been accumulated in the housing 186, the pressure P of the hydraulic cylinder 354 increases up to the pressure $P_0$, before the time $t_2$ passes. In this case, a positive judgment is made at Step S106, and the control of the computer goes to Step S113 to judge whether the hydraulic pressure P is equal to, or greater than, a predetermined pressure value $P_1$. The pressure value $P_1$ is predetermined to be somewhat smaller than a valve opening pressure of a solenoid-operated proportional relief valve (not shown) which controls the pressure of a working fluid supplied to the hydraulic cylinder 354. If the compressing ram 204 is advanced till the compressing force of the ram 204 increases up to a predetermined force value, the hydraulic pressure P increases up to the pressure value $P_1$. Thus, at Step S113, the computer judges whether the ram 204 has stopped advancing and has started finalizing the compression of the chip. At an early stage, a negative judgment is made at Step S113. Meanwhile, if the ram 204 stops and the hydraulic pressure P reaches the pressure value $P_1$, a positive judgment is made at Step S113 and the control goes to Step S114 to judge whether a predetermined time, $t_3$, has passed. The time $t_3$ is predetermined to be somewhat longer than a time for which the ram 204 can finalize the compression of the chip, i.e., finally set the compressed chip block 236, irrespective of what amount of chip may have been accumulated in the housing 186, but depending upon the nature of the chip.

Thus, at Step S114, the computer judges whether the ram 204 has finalized the compression of the chip. At an early stage, a negative judgment is made at Step S114. Meanwhile, if the ram 204 has finally set the compressed chip block 236 and the time $t_3$ has passed, a positive judgment is made at Step S114 and the computer carries Step S115 which is the same as Step S12 of FIG. 8. Steps S102 to S114 provide the chip compressing steps.

Next, there will be described the case where the predetermined time $t_2$ is short and the chip compressing device 350 is aimed at providing compressed chip blocks 236 having a generally uniform size. The time $t_2$ is predetermined to be somewhat longer than such a short time which is needed for the compressing ram 204 to advance and contact too much amount of chip accumulated in the housing 186 (accordingly, the ram 204 cannot compress the chip). The pressure value $P_0$ is predetermined to be small, like in the above-described case where the time $t_2$ is long. The number $n_0$ is predetermined to be smaller than the number of workpieces 14 corresponding to an amount of chip which assures that the hydraulic pressure P increases up to the pressure value $P_0$ within the predetermined time $t_2$, and the maximum number $n_{max}$ is predetermined to be greater than the above number.

After a positive judgment is made at Step S103, the predetermined time $t_2$ passes before the hydraulic pressure P increases up to the pressure value P0, if an amount of chip accumulated in the housing 186 is not enough to be compressed. Meanwhile, if the number of workpieces 14 machined increases and the amount of chip increases, the hydraulic pressure P increases up to the pressure value P0 before the time $t_2$ passes, and a positive judgment is made at Step S106. Thus, the compressing ram 204 compresses the chip. Since the time $t_2$ is short, the hydraulic pressure P can increase up to the pressure P0 within the time $t_2$, only when the amount of chip accumulated in the housing 186 has increased up to around a maximum or upper-limit amount which is permitted to be accumulated in the housing 186. In other words, the ram 204 is prevented from compressing smaller amounts of chip. Thus, the chip compressing device 350 provides compressed chip blocks 236 having a generally uniform size. In this case, Steps S110 and S111 are provided for waiting for the accumulation of respective amounts of chip which provide the compressed chip blocks 236 of the generally uniform size. Thus, the chip compressing device 350 not only prevents "compressing the air" but also provides compressed chip blocks 236 having a generally uniform size. Steps S107 to S112 provide not only the chip-accumulation waiting steps but also the "compressing-the-air" preventing steps.

In the second embodiment shown in FIGS. 12 and 13, a portion of the controller that carries out Step S105 provides a compressing-time measuring device; and a portion of the controller that carries out Steps S104 to S106 provides a "compressing-the-air"-prevention commanding device.

In the case where the chip compressing device 350 is aimed at providing compressed chip blocks 236 having a generally uniform size, the time $t_3$ may be predetermined depending upon an amount of chip to be accumulated in the housing 186.

In the above-described second embodiment relating to the chip compressing device 350, it is assumed that the compressing device 350 compresses only the chip having the particular nature and that the time $t_2$ and the pressure $P_0$ are predetermined depending upon the nature of the chip. However, it is possible that the chip compressing device 350 compress a plurality of sorts of chip having different natures and that the time $t_2$ and the pressure $P_0$ be predetermined depending upon the nature of each sort of chip. In the latter case, the compressing device 350 can compress the different sorts of chip into respective compressed chip blocks 236 having a generally uniform size. In addition, the time $t_3$ may be predetermined depending upon the nature of the chip. Otherwise, the time values $t_2$, $t_3$ and the pressure value $P_0$ may be predetermined irrespective of what nature the chip may have. In the case where the compressing device 350 is aimed at providing chip blocks 236 having a generally uniform size, the time $t_3$ may be predetermined depending upon the amount of chip to be accumulated in the housing 186. Alternatively, the time $t_3$ may be predetermined to be somewhat longer than a time needed for the compressing device 350 to finalize the compression of the chip, i.e., completely set the compressed chip, irrespective of whether the device 350 may compress only chip having a particular nature, and/or irrespective of whether the device 350 may be aimed at preventing "compressing the air" or at providing compressed chip blocks 236 having a uniform size.

In the second embodiment, the computer judges whether the compressing ram 204 has completed the compression of the chip, by judging whether the predetermined time $t_3$ has passed after the ram 204 has stopped advancing. However, the above judgment may be made by judging whether a predetermined time sufficient for the ram 204 to compress the chip (including finalizing the compression of the chip) has passed after the output signal of the ram-compressing switch 252 turns from the OFF signal to the ON signal. The above time may be predetermined depending upon the nature of the chip, or the amount of chip to be accumulated in the housing 186, or may be predetermined irrespective of the nature or amount of the chip to be compressed.

Figure 14:
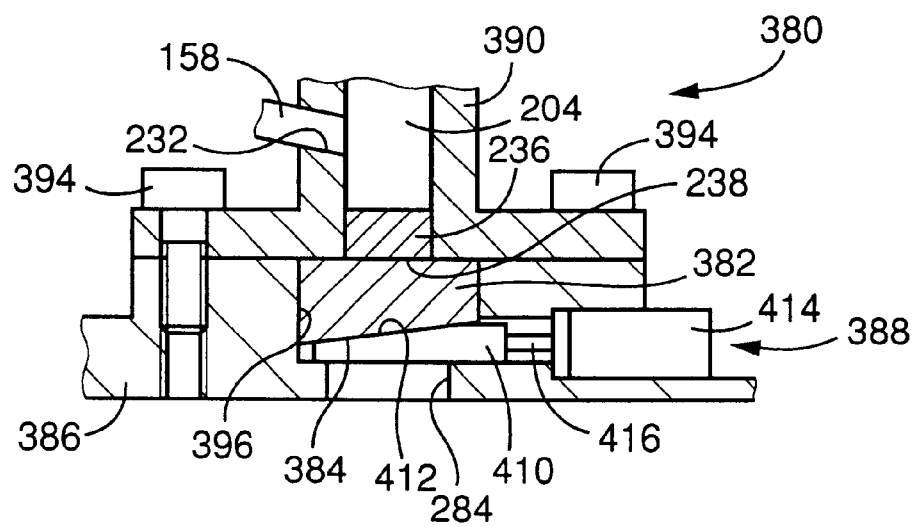
FIG. 14 is a partly cross-sectioned, front elevation view of a relevant portion of another chip compressing device as a third embodiment of the present invention.

In each of the first and second embodiments, the housing 186 is separable from the movable member 272. However, it is possible that a movable member be separable from a housing. FIG. 14 shows a third embodiment relating to a chip compressing device 380 wherein a movable member 382 is movable toward, and away from, a cylindrical housing 390 because of the engagement of an inclined surface 384 of the movable member 382 and an inclined surface 412 of a movable-member supporting device 388 provided on a frame 386. The other elements of the chip compressing device 380 are the same as those of the chip compressing device 48 or 350. The same reference numerals as used for the device 48 or 350 are used to designate the corresponding elements of the device 380, and the description of those elements is omitted.

Figure 15:
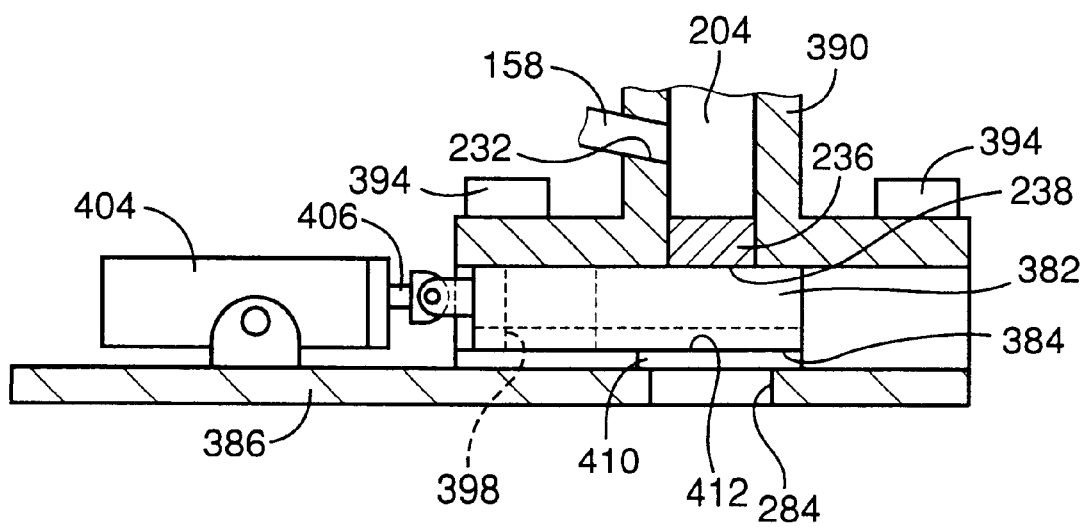
FIG. 15 is a partly cross-sectioned, side elevation view of the relevant portion of the chip compressing device of FIG. 14.

In the third embodiment, the housing 390 is fixed to the frame 386 with a plurality of bolts 394 as a fixing device. The frame 386 has a groove 396 formed in a portion thereof opposed to an open end of the housing 390, such that the groove 396 extends in a direction perpendicular to a central axis line of the housing 390. The movable member 382 is fitted in the groove 396, such that the movable member 382 is movable in the groove 396 relative to the frame 386. As shown in FIG. 15, the movable member 382 has a through-hole 398 having a circular cross section greater than that of an inner cylindrical space of the housing 390. The above-indicated inclined surface 384 of the movable member 382 is provided by a lower surface of the same 382, such that the inclined surface 384 is inclined relative to a plane (in the present embodiment, a vertical plane) which contains a central axis line of a compressing ram 204 and is parallel to the direction of movement of the movable member 382. The groove 396 has a depth greater than the thickness of the thickest portion of the movable member 382, and the movable member 382 is fitted in the groove 396 such that the movable member 382 is movable toward, and away from, the housing 390 in a direction parallel to the axis line of the housing 390.

The movable member 382 is moved to a closing position and an opening position by a hydraulic cylinder device 404 as a movable-member moving device. As shown in FIG. 15, the hydraulic cylinder 404 is supported by the frame 386 such that the cylinder 404 is pivotable about an axis line perpendicular to both the direction of movement of the movable member 382 and the axis line of the housing 390. The movable member 382 is connected to a piston rod 406 of the hydraulic cylinder 404 such that the movable member 382 is pivotable about an axis line parallel to the axis line about which the cylinder 404 is pivotable. The pivotal movement of the cylinder 404 permits the movable member 382 to move toward, and away from, the housing 390.

The movable-member supporting device 388 includes a wedge member 410. The above-indicated inclined surface 412 of the supporting device 388 is provided by an upper surface of the wedge member 410 that is opposed to the inclined surface 384 (i.e., lower surface) of the movable member 382. The wedge member 410 is supported by the frame 386 such that the wedge member 410 is movable in a direction perpendicular to the direction of movement of the movable member 382. The wedge member 410 is connected to a piston rod 416 of a hydraulic cylinder 414 as a drive device. When the piston rod 416 is advanced and retracted, the wedge member 410 is moved to a pressing position where the inclined surface 412 thereof engages the inclined surface 384 of the movable member 382 and presses the movable member 382 against the housing 390 owing to the action of the inclined surfaces 412, 384, and to a separation permitting position where, after the inclined surface 412 is moved relative to the inclined surface 384, the wedge member 410 permits the movable member 382 to move in a direction (in the present embodiment, downward) away from the housing 390.

When the compressing ram 204 starts compressing the chip, the movable member 382 is positioned at the closing position and the wedge member 410 is positioned at the pressing position, so that the movable member 382 is pressed against the housing 390 to close a chip-discharge outlet 238. The ram 204 cooperates with the movable member 382 and the housing 390 to compress the chip and thereby provide a chip block 236. After the compression of the chip, the ram 204 is retracted by a small distance and thus moved away from the chip block 236, and the wedge member 410 is moved to the separation permitting position, so that the movable member 382 is separated from the housing 390. The respective angles of inclination of the inclined surfaces 384, 412 of the movable member 382 and the wedge member 410 are predetermined such that when the ram 204 presses the movable member 382 via the chip, the movable member 382 is subjected to a friction force which assures that the wedge member 410 does not move off the position between the movable member 382 and the bottom of the groove 396, and such that in the state in which the chip block 236 is subjected to no compressing force of the ram 204, the wedge member 410 can be moved by only a small force to the separation permitting position. Immediately after the movable member 382 is separated from the housing 390, the spring back of the chip block 236 acts on the ram 204 and the movable member 382. However, the pressing force of the chip block 236 applied to the movable member 382 soon disappears, which permits the movable member 382 to be easily moved to the opening position.

After the movable member 382 is moved to the opening position, the compressing ram 204 is advanced to discharge the chip block 236 out of the housing 390. Then, the ram 204 is retracted to a predetermined limit position which is detected by a limit-position-reaching switch 254, and subsequently the movable member 382 is moved to the closing position. In this state, the wedge member 410 is moved to the pressing position, to press the movable member 382 against the housing 390.

In the third embodiment, the movable member 382 is moved relative to the housing 390. Therefore, the chip compressing device 380 needs an actuator (e.g., the hydraulic cylinder 414) for moving the movable member 382 toward, and away from, the housing 390. In contrast, in the first embodiment shown in FIGS. 1 to 13, the housing 186 is separable from the movable member 272, and accordingly no actuator is needed for separating the two members 186, 272 from each other. Thus, the chip compressing device 48 can be produced using a reduced number of parts, i.e., at a lower cost. In the third embodiment, in the state in which the movable member 382 is separated from the housing 390, a greater space is produced between the two elements 382, 390 than the space which is produced between the housing 186 and the movable member 272 when the housing 186 is separated from the movable member 272 in the first embodiment. Therefore, in the third embodiment, air can be more easily blown into the great space, so that the chip adhered to the respective contact surfaces of the movable member 382 and the housing 390 is blown off and is prevented from being bitten by the two elements 382, 390.

In each of the illustrated embodiments, after the compression of the chip, the compressing ram 204 is retracted by a small distance and thus moved away from the chip block 236, before the movable member 272, 382 is moved to the opening position. However, it is possible that the ram 204 be retracted by no distance but the compressing force of the ram 204 be zeroed. For example, the solenoid-operated direction-switch valve 222 which controls the supplying of the working oil to the hydraulic cylinder 206, 354 may be replaced with one which can be placed in a switch position in which both the rod-side and piston-side chambers of the cylinder 206, 354 are communicated with a reservoir. In the latter case, the compressing force of the ram 204 may be zeroed by switching the valve to the switch position, i.e., causing the two chambers to be communicated with the reservoir.

In each of the illustrated embodiments, the computer judges whether the compression of chip should be started, according to the chip compressing routine represented by the flow chart of FIG. 8 or FIG. 13. However, this is not essentially required, and may be omitted. For example, the compression of chip may be started in response to a compression-start command produced according to a different control routine. For instance, the compression-start command may be produced, according to the workpiece machining routine, each time the number of workpieces that have been machined increases up to a predetermined number, or at a predetermined regular time interval. Alternatively, in the case where a chip-amount measuring device is provided which measures an amount of chip passing through the introduction passage 158, the compression-start command may be produced when the amount of chip measured by the measuring device exceeds a predetermined amount, and the computer may estimate that the amount of chip stored in the housing 186, 390 has increased up to a predetermined amount. Otherwise, in the case where the compressing ram 204 usually closes the introduction inlet 232, so that the chip is stored in the introduction passage 158, and a transmission-type photoelectric switch is provided at an appropriate position in the passage 158, the computer may judge, when the state in which the light emitted by a light emitter of the switch is interrupted by the chip and is not received by a light receiver of the switch lasts for a predetermined time, that an amount of chip enough to be compressed has been stored in the passage 158. In the last case, the computer may be operated to retract the ram 204 to allow the chip to be introduced into the chip storing space 234, so that immediately thereafter the chip is compressed by the ram 204. The photoelectric switch may be replaced with a different sort of non-contact-type sensor.

In each of the illustrated embodiments, it is assumed that during the compression of the chip, the machining of another workpiece 14 is not started and that during the compression of the chip (including both the actual compression of the chip by the compressing ram 204 and the retraction and advancement of the ram 204 for preventing "compressing the air"), no amount of chip is sent toward the housing 186, 390. However, it is possible that during the compression of the chip, the machining of a workpiece 14 be started and/or an amount of chip be sent toward the housing 186, 390. During the compression, the ram 204 being advanced closes the introduction inlet 232, so that the chip is stored in the introduction passage 158. Accordingly, the machining of one or more workpieces 14 may be performed during the compression of the chip. In the latter case, the predetermined number $n_0$ of the workpieces machined that is used in judging whether to commence a chip compressing operation, and the predetermined number $n_{max}$ of the workpieces machined that is used in judging whether to terminate a "compressing-the-air" preventing operation may be counted according to the workpiece machining routine.

In each of the illustrated embodiments, the computer does not conclude that an abnormality has occurred to a chip compressing operation, even if just once the operation is discontinued before the chip is actually compressed by the compressing ram 204, and tries to compress the chip each time the machining of each one of a predetermined number of additional workpieces 14 ends. The computer concludes that an abnormality has occurred to the chip compressing operation, when the chip is not compressed by the ram 204 even after the machining of all the additional workpieces 14 has ended. However, the computer may be modified to conclude that an abnormality has occurred to a chip compressing operation, if just once the operation is discontinued before the chip is actually compressed by the ram 204. To this end, Steps S9 and S10 are omitted from the flow chart of FIG. 8, or Steps S110 and S111 are omitted from the flow chart of FIG. 13. In addition, to inform the operator of the occurrence of an abnormality and/or to command stopping the machining of workpieces 14 may not be performed according to the chip compressing routine represented by the flow chart of FIG. 8 or FIG. 13, and may be performed according to a different control routine.

The present invention may be applied to such a metallic-chip compressing device which is employed in an apparatus other than a lathe.

It is to be understood that the present invention may be embodied with other changes, improvements, and modifications that may occur to one skilled in the art without departing from the scope and spirit of the invention defined in the appended claims.

What is claimed is:

1. A chip compressing apparatus, comprising:
   a housing which has an inner space having opposite open ends;
   a movable member which is movable, along one of the opposite open ends of the housing, to a closing position where the movable member closes said one open end of the housing and to an opening position where the movable member opens said one open end, in a reference direction, the movable member having a constant thickness in the reference direction, and having a through-hole which extends substantially parallel to an axial direction of the housing and which has a cross section greater than a cross section of the inner space of the housing, wherein when the movable member is positioned at the opening position, the through-hole of the movable member is aligned with the inner space of the housing;
   a movable member moving device which moves, in the reference direction, the movable member to the closing position and to the opening position;
   a compressing ram which is inserted in the inner space of the housing through the other open end thereof, such that the compressing ram is movable in the axial direction of the housing;
   a ram moving device which moves the compressing ram in said axial direction so that the ram cooperates with the housing and the movable-member being positioned at the closing position to compress a metallic chip which is stored in the inner space of the housing; and
   a supporting device which supports the housing and the movable member such that at least when the compressing ram compresses the metallic chip, the housing and the movable member are not separated from each other, and at least when the movable member is moved from the closing position thereof to the opening position thereof, the housing and the movable member are separable from each other.

2. An apparatus according to claim 1, wherein the supporting device comprises:
   a main frame which supports the ram moving device and which supports the movable member on one of opposite sides thereof that is opposite to the housing;
   a housing attaching device which attaches the housing to the main frame such that the housing is separable from the movable member; and
   a biasing device which biases the housing in a direction toward the movable member.

3. An apparatus according to claim 1, wherein the supporting device has, in a portion thereof corresponding to the through-hole of the movable member being positioned at the opening position, a chip discharging passage which permits the compressed metallic chip to pass therethrough.

4. An apparatus according to claim 1, further comprising:
   an excessive-advancement detecting device which detects, when the compressing ram compresses the metallic chip stored in the inner space of the housing, that the ram has been excessively advanced to a predetermined limit position; and
   a controller which controls, when the excessive-advancement detecting device detects that the compressing ram has been excessively advanced, the ram moving device at least to stop the advancement of the ram.

5. An apparatus according to claim 4, wherein the excessive-advancement detecting device comprises:
   a ram-compressing detecting device which detects that the compressing ram is compressing the metallic chip stored in the inner space of the housing; and a limit-position-reaching detecting device which detects, when the ram-compressing detecting device is detecting that the compressing ram is compressing the metallic chip, that the ram has reached the predetermined limit position.

6. An apparatus according to claim 5, wherein the limit-position-reaching detecting device comprises:
   a detectable member which is movable with the compressing ram; and
   a detector which detects that the detectable member has been moved to a position corresponding to the predetermined limit position of the ram.

7. An apparatus according to claim 5, wherein the limit-position-reaching detecting device comprises:
   a compressing-time measuring device which measures a time for which the ram moving device moves the compressing ram to compress the metallic chip; and
   a load detecting device which detects a load exerted to the ram moving device,
   the controller controlling the ram moving device at least to stop the advancement of the ram, when the time measured by the compressing-time measuring device exceeds a predetermined time before the load detecting device detects a load not smaller than a predetermined load.

8. An apparatus according to claim 4, wherein the controller comprises a chip-discharging control portion which controls, when the compressing ram discharges the compressed metallic chip from the inner space of the housing, the ram moving device to continue the advancement of the ram for a predetermined time after the excessive-advancement detecting device detects that the ram has reached the predetermined limit position, and thereby causes a chip-compressing end portion of the ram to be projected out of said one open end of the housing.

9. An apparatus according to claim 1, wherein the movable member has a first inclined surface which extends in a first direction parallel to the reference direction, and wherein the apparatus further comprises:
   a wedge member which has a second inclined surface and is movable, in a second direction intersecting the reference direction, to a pressing position where the second inclined surface engages the first inclined surface and presses the movable member against the housing and to a separation permitting position where, after the second inclined surface is moved relative to the first inclined surface, the wedge member permits the movable member to move in a third direction away from the housing; and
   a drive device which moves, in the second direction, the wedge member to the pressing position and to the separation permitting position.

10. A chip compressing apparatus, comprising:
    a housing which has an inner space having opposite open ends;
    a movable member which is movable, along one of the opposite open ends of the housing, to a closing position where the movable member closes said one open end of the housing and to an opening position where the movable member opens said one open end;
    a movable-member moving device which moves the movable member to the closing position and to the opening position;
    a compressing ram which is inserted in the inner space of the housing through the other open end thereof, such that the compressing ram is movable in an axial direction of the housing;
    a ram moving device which moves the compressing ram in said axial direction so that the compressing ram cooperates with the housing and the movable member being positioned at the closing position to compress metallic chip which is stored in the inner space of the housing;
    an excessive-advancement detecting device which detects, when the compressing ram compresses the metallic chip stored in the inner space of the housing, that the ram has been excessively advanced to a predetermined limit position; and
    a controller which controls, when the excessive-advancement detecting device detects that the compressing ram has been excessively advanced, the ram moving device at least to stop the advancement of the ram.

11. An apparatus according to claim 10, wherein the excessive-advancement detecting device comprises:
    a ram-compressing detecting device which detects that the compressing ram is compressing the metallic chip stored in the inner space of the housing; and
    a limit-position-reaching detecting device which detects, when the ram-compressing detecting device is detecting that the compressing ram is compressing the metallic chip, that the ram has reached the predetermined limit position.

12. An apparatus according to claim 11, wherein the limit-position-reaching detecting device comprises:
    a detectable member which is movable with the compressing ram; and
    a detector which detects that the detectable member has been moved to a position corresponding to the predetermined limit position of the ram.

13. An apparatus according to claim 11, wherein the limit-position-reaching detecting device comprises:
    a compressing-time measuring device which measures a time for which the ram moving device moves the compressing ram to compress the metallic chip; and
    a load detecting device which detects a load exerted to the ram moving device,
    the controller controlling the ram moving device at least to stop the advancement of the ram, when the time measured by the compressing-time measuring device exceeds a predetermined time before the load detecting device detects a load not smaller than a predetermined load.

14. An apparatus according to claim 10, wherein the controller comprises a chip-discharging control portion which controls, when the compressing ram discharges the compressed metallic chip from the inner space of the housing, the ram moving device to continue the advancement of the ram for a predetermined time after the excessive-advancement detecting device detects that the ram has reached the predetermined limit position, and thereby causes a chip-compressing end portion of the ram to be projected out of said one open end of the housing.

15. A chip compressing apparatus, comprising:
    a housing which has an inner space having opposite open ends;
    a movable member which is movable, along one of the opposite open ends of the housing, to a closing position where the movable member closes said one open end of the housing and to an opening position where the movable member opens said one open end;

a movable member moving device which moves the movable member to the closing position and to the opening position;

a compressing ram which is inserted in the inner space of the housing through the other open end thereof, such that the compressing ram is movable in an axial direction of the housing;

a ram moving device which moves the compressing ram in said direction so that the ram cooperates with the housing and the movable member being positioned at the closing position to compress a metallic chip which is stored in the inner space of the housing; and a supporting device which supports the housing and the moveable member such that at least when the compressing ram compresses the metallic chip, the housing and the moveable member are not separated from each other, and at least when the moveable member is moved from the closing position thereof to the opening position thereof, the housing and the movable member are separable from each other, the supporting device comprising:

a main frame which supports the ram moving device and which supports the movable member on one of opposite sides thereof that is opposite to the housing;

a housing attaching device which attaches the housing to the main frame such that the housing is separable from the movable member; and a biasing device which biases the housing in a direction toward the movable member.

16. An apparatus according to claim 15, wherein the biasing device comprises an elastic member which is provided between the main frame and the housing.

17. An apparatus according to claim 15, wherein the movable member is elastically sandwiched, based on a biasing force of the biasing device, between the housing and a portion of the main frame that supports the movable member.

18. An apparatus according to claim 15, wherein the main frame comprises a plurality of guide rods which cooperate with each other to support the housing such that the housing is movable in the axial direction thereof.

19. An apparatus according to claim 18, wherein the biasing device comprises an elastic member which is provided between the housing and each of at least two of the guide rods.

20. An apparatus according to claim 19, wherein each of the elastic members comprises a disc spring which is provided around a corresponding one of the guide rods.

* * * * *